(12) United States Patent
Kantor et al.

(10) Patent No.: US 7,653,679 B2
(45) Date of Patent: Jan. 26, 2010

(54) SYSTEMS AND METHODS FOR MULTI-STAGE MESSAGE BROKERING

(75) Inventors: Jiri Kantor, London (GB); Andrew Patterson, Chatham (GB); Paul Bevis, Harrow (GB); David Turvey, Ely (GB); Craig McMillan, Freldang (NO); Andrew Sadler, Colchester (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1296 days.

(21) Appl. No.: 10/219,461

(22) Filed: Aug. 15, 2002

(65) Prior Publication Data

US 2003/0126229 A1 Jul. 3, 2003

(30) Foreign Application Priority Data

Aug. 16, 2001 (GB) ................. 0120016.1

(51) Int. Cl.
*G06F 15/16* (2006.01)
*G06F 15/173* (2006.01)
*G06F 9/44* (2006.01)
*G06F 11/00* (2006.01)
*G06F 15/177* (2006.01)
*G06F 9/46* (2006.01)
*G06F 3/00* (2006.01)
*G06F 13/00* (2006.01)
*G06Q 40/00* (2006.01)

(52) U.S. Cl. .............. 709/201; 709/203; 709/219; 709/224; 709/248; 714/4; 714/18; 718/101; 719/314

(58) Field of Classification Search .......... 709/201, 709/203, 219, 221, 223, 224, 248, 227; 714/15–21, 714/4; 718/101; 719/314; 705/35
See application file for complete search history.

(56) References Cited

U.S. PATENT DOCUMENTS 5,305,200 A 4/1994 Hartheimer et al.

(Continued)

FOREIGN PATENT DOCUMENTS

EP 0275135 7/1988

(Continued)

OTHER PUBLICATIONS

Evans, K. et al. "Transaction Internet Protocol—Requirements and Supplemental Information," RFC 2372, Jul. 1998, pp. 1-24.*
Lyon, J. et al. "Transaction Internet Protocol, Version 3.0," RFC 2371, Jul. 1998, pp. 1-31.*
Bossert, G. et al. "Considerations for Web Transaction Security," RFC 2084, Jan. 1997, pp. 1-6.*

(Continued)

*Primary Examiner*—Vivek Srivastava
*Assistant Examiner*—Melvin H Pollack
(74) *Attorney, Agent, or Firm*—Meyertons, Hood, Kivlin, Kowert & Goetzel, P.C.

(57) ABSTRACT

A message brokering mechanism for performing a recovery operation in a transaction processing system including first and second stages operable to exchange message requests and responses. The first stage may receive a message request from a message source and may check whether the message request is a special message request. This may be by way of checking if a recovery attribute of the message request is set. A normal message request may have a recovery attribute that is not set. If the message request is a special message request, it may be dispatched to the second stage. If the message request is a normal message request, it may be dispatched to the second stage if the normal message request is not a repeat normal message request.

33 Claims, 15 Drawing Sheets

U.S. PATENT DOCUMENTS

| | | | |
|---|---|---|---|
| 5,499,384 | A | 3/1996 | Lentz et al. |
| 5,544,329 | A | 8/1996 | Engel et al. |
| 5,671,279 | A | 9/1997 | Elgamal |
| 5,696,966 | A | 12/1997 | Velarde |
| 5,720,455 | A | 2/1998 | Kull et al. |
| 5,815,665 | A * | 9/1998 | Teper et al. ............... 709/229 |
| 5,982,293 | A | 11/1999 | Everett et al. |
| 6,237,035 | B1 | 5/2001 | Himmel et al. |
| 6,256,659 | B1 | 7/2001 | McLain, Jr. et al. |
| 6,483,912 | B1 | 11/2002 | Kalmanek, Jr. et al. |
| 6,523,102 | B1 | 2/2003 | Dye et al. |
| 6,529,932 | B1 | 3/2003 | Dadiomov et al. |
| 6,636,855 | B2 | 10/2003 | Holloway et al. |
| 6,647,510 | B1 * | 11/2003 | Ganesh et al. ............... 714/16 |
| 6,704,884 | B1 * | 3/2004 | Shepherd et al. ............... 714/4 |
| 6,711,614 | B1 * | 3/2004 | Suzuki ...................... 709/224 |
| 6,732,124 | B1 * | 5/2004 | Koseki et al. ............... 707/202 |
| 6,769,079 | B1 * | 7/2004 | Currey et al. ............... 714/45 |
| 6,772,363 | B2 * | 8/2004 | Pedone et al. ............... 714/4 |
| 6,785,786 | B1 * | 8/2004 | Gold et al. ............... 711/162 |
| 6,817,010 | B2 * | 11/2004 | Aizenbud-Reshef et al. 717/127 |
| 6,817,018 | B1 * | 11/2004 | Clarke et al. ............... 719/313 |
| 6,834,325 | B1 * | 12/2004 | Milillo et al. ............... 711/113 |
| 6,836,803 | B1 * | 12/2004 | Swartz et al. ............... 709/227 |
| 6,845,507 | B2 * | 1/2005 | Kenton ...................... 719/314 |
| 6,856,970 | B1 | 2/2005 | Campbell et al. |
| 6,865,591 | B1 * | 3/2005 | Garg et al. ............... 709/201 |
| 6,898,574 | B1 * | 5/2005 | Regan ...................... 705/38 |
| 6,925,482 | B2 * | 8/2005 | Gopal et al. ............... 709/201 |
| 6,934,247 | B2 * | 8/2005 | Bhattal et al. ............... 370/216 |
| 6,950,867 | B1 | 9/2005 | Strohwig et al. |
| 6,957,199 | B1 * | 10/2005 | Fisher ...................... 705/78 |
| 6,961,750 | B1 | 11/2005 | Burd et al. |
| 6,976,260 | B1 * | 12/2005 | Ault et al. ............... 719/314 |
| 6,978,279 | B1 * | 12/2005 | Lomet et al. ............... 707/202 |
| 6,983,395 | B2 * | 1/2006 | Chen et al. ............... 714/4 |
| 6,983,409 | B1 | 1/2006 | Vollmer et al. |
| 6,996,711 | B2 | 2/2006 | Patterson et al. |
| 7,003,571 | B1 * | 2/2006 | Zombek et al. ............... 709/227 |
| 7,010,590 | B1 * | 3/2006 | Munshi ...................... 709/224 |
| 7,032,005 | B2 * | 4/2006 | Mathon et al. ............... 709/206 |
| 7,062,749 | B2 | 6/2006 | Cyr et al. |
| 7,069,554 | B1 | 6/2006 | Stammers et al. |
| 7,089,564 | B2 * | 8/2006 | Chen et al. ............... 719/314 |
| 7,092,940 | B1 * | 8/2006 | Ethen et al. ............... 707/6 |
| 7,103,016 | B1 | 9/2006 | Duffy et al. |
| 7,110,969 | B1 | 9/2006 | Bennett et al. |
| 7,110,981 | B1 | 9/2006 | Sidikman et al. |
| 7,117,172 | B1 | 10/2006 | Black |
| 7,140,017 | B2 * | 11/2006 | Chen et al. .................. 718/101 |
| 7,155,483 | B1 * | 12/2006 | Friend et al. ............... 709/206 |
| 7,162,512 | B1 * | 1/2007 | Amit et al. ............... 709/206 |
| 7,177,917 | B2 * | 2/2007 | Giotta ...................... 709/219 |
| 7,206,805 | B1 * | 4/2007 | McLaughlin, Jr. .......... 709/203 |
| 7,209,950 | B2 * | 4/2007 | Bennett et al. ............... 709/206 |
| 7,219,260 | B1 * | 5/2007 | de Forest et al. ............... 714/15 |
| 7,249,344 | B1 * | 7/2007 | Zeanah et al. ............... 717/100 |
| 7,266,526 | B1 * | 9/2007 | Drummond et al. .......... 705/43 |
| 7,277,919 | B1 * | 10/2007 | Donoho et al. ............... 709/206 |
| 7,289,964 | B1 | 10/2007 | Bowman-Amuah |
| 7,290,056 | B1 * | 10/2007 | McLaughlin, Jr. .......... 709/230 |
| 7,293,090 | B1 * | 11/2007 | Saleh et al. ............... 709/226 |
| 2003/0126077 | A1 | 7/2003 | Kantor et al. |

FOREIGN PATENT DOCUMENTS

| | | |
|---|---|---|
| EP | 0471090 | 3/1991 |
| EP | 0 557 025 | 8/1993 |
| GB | 2314663 | 5/1996 |
| GB | 2378781 | 2/2003 |
| GB | 2378782 | 2/2003 |
| WO | 95/10805 | 4/1995 |
| WO | 97/46939 | 12/1997 |
| WO | 01/33407 | 5/2001 |

OTHER PUBLICATIONS

Crocker, D. et al. "SMTP Service Extension for Checkpoint/Restart," RFC 1845, Sep. 1995, pp. 1-7.*

"Method for Avoiding and Repairing Damage to Distributed Transactions in a Coordinated Resource Recovery System," IBM Technical Disclosure Bulletin, EBM Corporation, vol. 33, No. 10A, pp. 362-366, Mar. 1, 1991.

European Search Report, Reference P011535EP JMP, Application No. 02255688, Aug. 29, 2005.

International search report application No. GB 0120015.3 mailed May 21, 2002.

"Duplicate Transaction System (DTS) Documentation", Intellipay, Inc., US, Mar. 2001, www.intellipay.com/docs/DTS.html (4 pages).

Office Action in U.S. Appl. No. 10/219,459 mailed Nov. 21, 2007.

European Search Report, Reference P011693EP JMP, Application No. 02255700.3-2221, Aug. 19, 2005.

International search report application No. GB 0120016.1 mailed May 20, 2002.

"Best Practices for Availability of Java Applications Using the Oracle 9i Internet Application Server," Hallmark, Oracle Technology Network, May 15, 2001, Version 1.1, pp. 1, 2, 17 and 18.

Final Office Action dated Jun. 11, 2008 in U.S. Appl. No. 10/219,459, filed Aug. 15, 2002, entitled: Message Brokering Kantor, et al.

* cited by examiner

SYSTEMS AND METHODS FOR MULTI-STAGE MESSAGE BROKERING

BACKGROUND OF THE INVENTION

The present invention relates to message brokering. Illustrative embodiments relate to, but not exclusively to, a message brokering system operable to implement a transaction recovery process.

Transaction processing systems are used to manage transactions in which an instructing party desires that an action be performed, often remotely, by at least one further party. In order for a transaction to take place between the parties, the instructing party provides a message to the further party requesting that the desired action be performed. In addition to the further party receiving the request to perform a desired action, the transaction process usually also entails a response, such as a message, being sent from the further party to the instructing party either to confirm that the action has been, or will be, completed, or to state that the transaction request has failed and/or why the desired action has failed.

An example of an action that might be performed as part of a transaction includes the case where a first party instructs a second party to request authorization of a payment from a third party. It is interesting to note that both the number and the importance of such transactions involving third parties, particularly in respect of those involving financial or commercial transactions, have increased enormously since the advent of inexpensive and readily-available networked electronic systems. In particular, growth in the use of such transactions is in large part attributable to the growth in Internet use for electronic commerce, where a user will typically buy a product on-line from a retailer by providing personal details to the retailer who will subsequently use the services of another party, such as a bank or credit card company, to authorize a payment for the product before it can be shipped to the user.

Where financial transactions are processed using the Internet, certain disadvantages may manifest themselves. In certain systems in which transactions are received from the Internet and then processed by a banking system, the danger exists of the banking system receiving repeat identical requests to process the same transaction. This may happen if a response to a message request indicating that the message request has been dealt with is delayed or lost in transmission from the banking system to the instructing party, subsequently causing the instructing party to issue repeat requests. An added danger also exists that the banking system may perform a transaction, such as, for example, crediting a retailer account and debiting a user account, more than once under the instruction of one or more repeat requests.

However, even if the banking system is configured to filter repeat requests, it is possible that such repeat requests will be generated which will bypass the filter mechanism if the banking system goes off-line, for example following events such as a system crash or during an administrative process. In this case incomplete transactions may still be in the banking system when it goes off-line. For this reason following a system crash, or during an administrative process, the banking system will often be taken completely off-line or be forced to enter a recovery mode to deal with any incomplete transactions. Where this happens, users of the system may find a delayed service, or even no service at all, without being aware of when or if their transaction request is going to be processed. This may in turn cause the users to wait in ignorance or even to resubmit a transaction for processing. Both of these scenarios are undesirable, with the latter being particularly so as the user may find they have submitted more than one valid request for the same transaction, and once the banking system goes back on-line both these transactions may be processed as they may not be deemed to be the same request by any repeat request filter mechanism.

SUMMARY OF THE INVENTION

According to a first aspect of the invention, there is provided a message brokering mechanism for performing a recovery operation in a transaction processing system, comprising first and second stages operable to exchange message requests and responses, wherein the first stage is operable to receive a message request from a message source and to check whether the message request is a special message request. Special message requests may be identified by the state of a recovery attribute of the message request. For example, where the recovery attribute is set the message request may be a special message request. The message request may be a normal message request where the recovery attribute of the message request is not set. The first stage may be operable to dispatch special message requests to the second stage. The first stage may be operable to dispatch normal message requests to the second stage conditional on the message request not being a repeat normal message request.

The message brokering mechanism is operable to control, or broker, the dispatch of message requests and responses between the first and second stages. The first and second stages may comprise logic modules implemented using software, firmware or hardware elements, or any combination thereof, and the stages may form part of one or more interfaces between the message brokering mechanism and other systems, processes etc.

By using this arrangement the first stage acts to screen the second stage from repeat normal message requests. This allows an incoming repeat normal message request sent from the message source to be quickly dealt with by the message brokering mechanism without needing to dispatch the repeat request to any "back-end" request processing mechanism, such as a banking system, that may be linked to the message brokering mechanism. In addition, not only is the amount of processing that must be performed by the back-end mechanism reduced, but also the message source sees an improved speed of response to repeat message requests, thereby reducing the likelihood that any further repeat message requests will be sent by it.

A request for which a critical action (such as the processing of a transaction, for example) is performed only once in response to that request being received, no matter how many times the request is repeated, is said to be idempotent. Systems or processes implementing such request handling may be referred to as idempotent systems or processes, or as exhibiting idempotency. One or more of the stages may posses the property of idempotency, e.g. two-stage idempotency can be implemented.

By determining whether the messages are normal or special, a recovery process is enabled in spite of the screening properties of the first stage. Only the normal message requests are subject to the screening provided by the first stage, any special message requests can bypass the first stage processing. The special message requests may be incomplete message requests that are retransmitted into the message brokering mechanism through the first stage for further processing. In this way, the message brokering mechanism can still accept message requests from a message source whilst implementing the recovery process. The message requests may have attributes, such as, for example, a recovery and/or recovery initiation attribute. Other types of message request can be acted upon by the message brokering mechanism, and may be used to remotely trigger the recovery process, for example by sending such a message over the Internet, by e-mail, short messaging service (SMS) message etc.

Special message requests may be identified by the state of a recovery attribute of the message request being set. Normal message requests may be identified by the state of the recovery attribute of the message request not being set. The first stage may be operable to dispatch special message requests to the second stage. The first stage may be operable to dispatch normal message requests to the second stage conditional on the message request not being a repeat normal message request.

The first stage may be further operable to check whether there is an existing first stage response to a normal message request and, conditional on there being an existing first stage response, to dispatch the existing first stage response to the message source. Where a message request is identified as having a known existing first stage response, such as might be the case if the message request is a repeated message, the existing response is dispatched back to the message source. The first stage may also be operable to dispatch a message indicating that a response to the message request is not ready for transmission to the message source, where there is no existing first stage response to a normal message request that has been dispatched previously to the second stage. These messages inform the message source, and ultimately its user, as to the state of current processing. The latter case relates to a message indicating that the request is "in progress".

The "in progress" message, or a token or indicator identifying it, may then be recorded as an existing first stage response that will be dispatched again to the message source in response to any further repeat message requests received by the first stage. This reduces the amount of processing that is needed by the first stage in responding to further repeat message requests. Subsequently, once received by the first stage, a response to the original message request may be dispatched to the message source and a copy used to overwrite the previous "in progress" message (or token or indicator). Responses may comprise any form of information, such as a simple acknowledgement message or, for example, more complex information such as authorization codes and/or encrypted data/software/information etc.

The second stage is operable to receive a message request from the first stage. The second stage may be further operable to check whether there is an existing second stage response to the message request and, conditional on there being an existing second stage response, to dispatch the existing second stage response to the first stage. The second stage may therefore be operable to use screening for both normal and special message requests and be operable to screen any further mechanisms (such as software, hardware, firmware, etc. or any combination thereof) to which the second stage is connected from repeat requests for which there is already an existing response.

The second stage may be operable to check whether a message request has been dispatched previously to a message processor and, where the message request has not been dispatched previously to a message processor, to dispatch the message request to a message processor. The message processor may then process the message request and generate an associated response for dispatching to the first stage. The second stage may form a component of an interface to a transaction processing system, such as, for example, a banking system.

The second stage may be further operable to dispatch a message indicating that a response to a message request is not ready for transmission to the first stage, conditional on there being no existing second stage response and the normal message request having been dispatched previously to the message processor. This message may be produced after a set "time-out" period when no response from the message processor is forthcoming. This provides an early indication to the first stage that the normal message request is being processed, and this in turn may lead to the freeing of resources at the message source and/or the message brokering mechanism by helping to prevent the generation of repeat message requests. The second stage may screen the message processor from repeat special and normal message requests.

A message queue mechanism may also be included in the second stage. The message queue mechanism may act as an interface between the second stage and the message processor, and may be used where the message processor is reliable. However, if the message processor is not completely reliable the message processor may lose a message request. Furthermore, if the message processor is not a transactional message processor, should the message processor lose a message request then there is no way to recover the transaction associated with that message request, other than by way of intervention by an administrator. The second stage may enter a wait state where no response from the message processor is forthcoming before recording timed-out messages for the attention of an administrator.

A further aspect of the invention addresses the issue of automatically attending to recovery of transactions should they be lost by, or on their way to or from, the message processor. The second stage may be operable to check, e.g. following the elapse of a predetermined time period (e.g. a "time out"), whether an actioned response has been dispatched from the message processor in response to the message request. The actioned response may indicate that the message processor has completed the action (or actions) necessary to deal with the message request. This enables the second stage to determine if a message request has been lost.

Although the second stage may be able to determine autonomously whether the message processor has lost a message request, it may either in addition, or alternatively, interrogate the message processor for information relating to the message request. In one example, the message processor and the second stage are able to communicate using query messages implemented according to a query protocol, such as, for example, a structured query language (SQL) protocol. The query messages can be used to indicate various states of the message processor to the second stage. This enables the second stage to tailor its actions according to the status of the message processor. For example, the second stage may redispatch the message request to the message processor so as to reinstate a transaction lost by the message processor. An additional benefit of using a query-based message brokering mechanism that may interrogate the message processor is that it allows the message brokering mechanism to be used idempotently with both transactional and non-transactional message processors.

Other examples of the information that query messages may convey include: that the message processor is currently processing the message request; that the message request has already been processed; the result of processing the message request; that the second stage should wait (e.g. for another "time out" period) and possibly resend the query later; and that the second stage should await the result of processing the message request. Query message responses can be used to tailor the operation of the second stage to suit a particular type of message processor, such as, for example, banking legacy systems of differing types.

The message brokering mechanism may comprise a recovery mechanism. The recovery mechanism can be implemented using at least one of hardware, software and firmware, for example. The recovery mechanism may be operable to identify message requests eligible for restarting, to convert the message requests eligible for restarting to special message requests, and to dispatch the special message requests to the first stage. The special messages can be dispatched to the first stage by the recovery mechanism so as to appear as if they originate from a message source. The recovery mechanism may identify message requests eligible for restarting by checking records of previously dispatched message requests and any responses (or corresponding identifiers such as message digests, tokens etc.) to find which message request(s) has/have no associated response.

In order to maintain the records of previously dispatched message requests, the message brokering mechanism may record message identities. The responses, or indicators or pointers to them, may also be recorded along with associated identifiers and/or message attributes so as to maintain dynamic records of existing first and/or second stage responses. This allows the message brokering mechanism to maintain records of the current processing state of transactions at various points and any responses generated in response to them.

According to another aspect of the invention, messages may be dispatched between the first and second stages by a transaction control mechanism. The transaction control mechanism may comprise one or more of software, hardware, firmware and/or signal generating components (for example, radio frequency (RF), optical etc.). In one example, the transaction control mechanism comprises a transaction server operable to dispatch message requests and responses over a network. The network may be an existing payment services network, such as, for example, an automated teller machine (ATM) or private banking network. The transaction server may comprise a computer program element operating on a data processing apparatus that accepts requests destined for the second stage from the first stage and a network and associated services, through which the requests may be dispatched to the second stage.

According to another aspect of the invention, there is provided a transaction processing system comprising a message brokering mechanism in accordance with any of the previously described aspects of the present invention. The message brokering mechanism may act as middleware located between a user generating message requests and a message processor, such as a banking system. In one such example, the message brokering mechanism is formed by using co-operating distributed components of both hardware and software.

According to another aspect of the present invention, there is provided a method of brokering messages for performing a recovery operation in a transaction processing system having first and second stages operable to exchange message requests and responses, the method comprising: receiving a message request from a message source at a first stage; and checking whether the message request is a special message request. The method may comprise steps corresponding to any one, or any combination, of the operations that are capable of being performed by the message brokering mechanism or any element of it.

According to another aspect of the invention, there is provided a first stage logic module forming an element of the message brokering mechanism. According to yet another aspect of the invention, there is provided a second stage logic module forming an element of the message brokering mechanism. Each of the first and/or second stage logic modules may be implemented as a program element comprising program code operable to configure one or more data processing apparatus(es) to provide the necessary functionality. The first and/or second stage logic module(s) may be part of an interface. The first and/or second stage logic module(s) may be modular computer program elements that can be added to an existing transaction controller software application, such as a trust based transaction controller, and/or various network routing services.

According to another aspect of the invention, there is provided a transaction processing system, comprising: at least one request generating apparatus operably coupled to a first network; a first stage operably coupled to the first network to receive message requests from and to dispatch message responses corresponding to respective processed message requests to the at least one request generating apparatus through the first network; a transaction controller server operably coupled to the first stage to receive message requests therefrom and to dispatch message responses thereto; a second stage operably coupled to the transaction controller server to receive message requests therefrom and to dispatch message responses thereto; and a transaction processing apparatus coupled to the second stage to process requests received therefrom and dispatch message responses corresponding to respective processed message requests thereto; wherein the transaction processing system is operable to initiate a transaction recovery process without entering a special operational recovery mode. The transaction controller server may be operatively coupled to the second stage through a second network, such as, for example, a private banking network.

According to another aspect of the invention, there is provided a method of performing a recovery in an automated transaction processing system, comprising: checking for incomplete responses to message requests; setting a special recovery attribute of any message requests for which there is no response or a non-actioned response; and re-dispatching the incomplete message requests as special message requests to the automated transaction processing system for further processing. The method may further comprise initiating the recovery process upon receiving a message request with a set recovery initiation attribute. The method may farther comprise screening repeat normal message requests of messages not having a set special recovery attribute at a first stage. The method may further comprise screening repeat special message requests at a second stage.

BRIEF DESCRIPTION OF THE DRAWINGS

Embodiments of the present invention will now be described, by way of example only, with reference to the accompanying drawings where like numerals refer to like parts and in which.

DESCRIPTION OF PARTICULAR EMBODIMENTS

Figure 1:
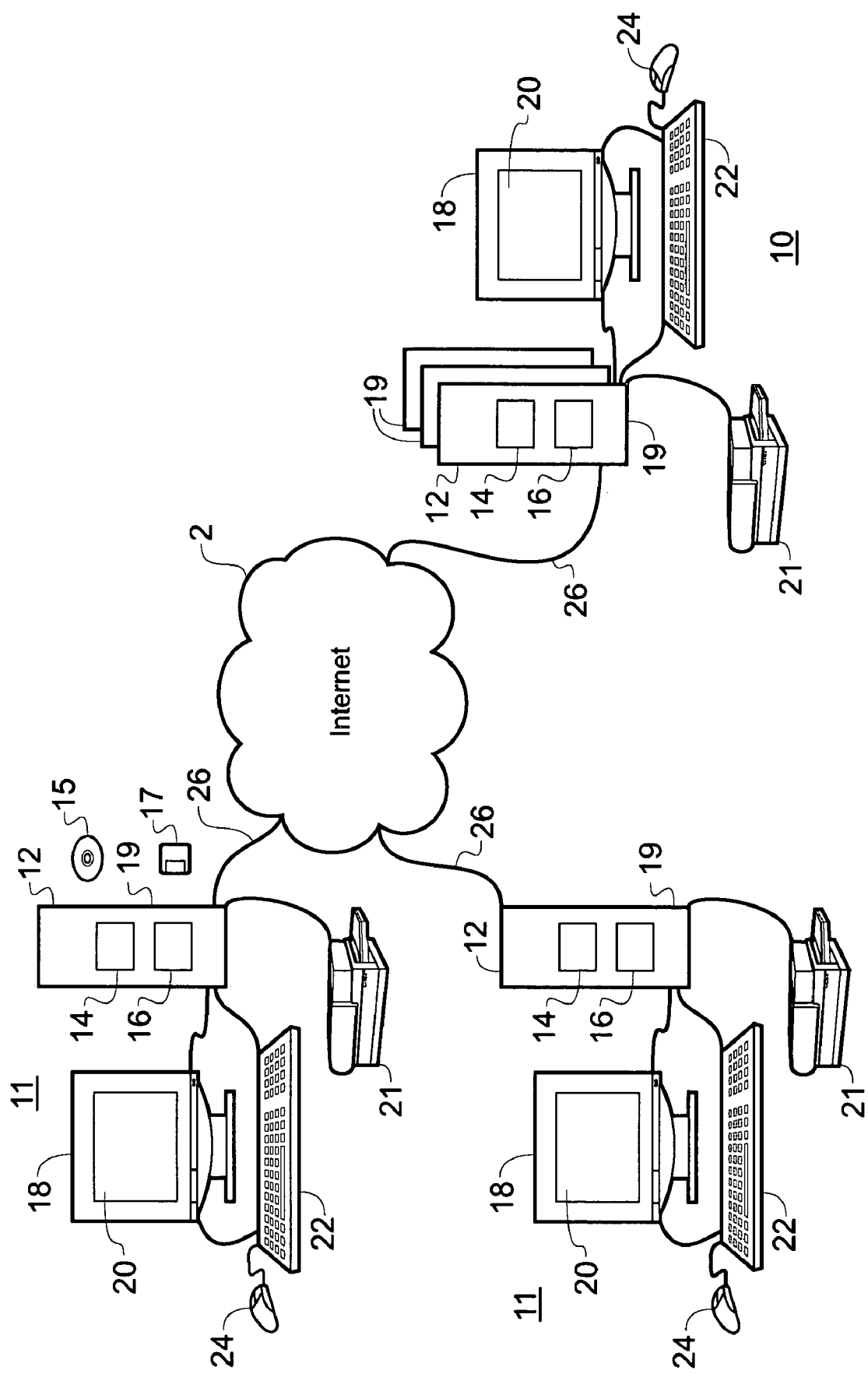
FIG. 1 shows a schematic representation of a network of computer systems usable to implement embodiments according to the present invention.

Referring now to FIG. 1, there is illustrated a schematic representation of a network of computer systems, such as the Internet, comprising a server computer system 10 and client computer systems 11. Both the server computer system 10 and the client computer systems 11 comprise similar components, for example a system unit 12, a display device 18 with a display screen 20, and user input devices, including a keyboard 22 and a mouse 24. A printer 21 is also connected to the system. Each system unit 12 comprises media drives, including an optical disk drive 14, a floppy disk drive 16 and an internal hard disk drive not explicitly shown in FIG. 1. A CD-ROM 15 and a floppy disk 17 are also illustrated. Additionally, server computer system 10 comprises high capacity storage media, such as further magnetic hard disks 19, for example.

A computer program for implementing various functions or conveying various information may be supplied on media such as one or more CD-ROMs and/or floppy disks and then stored on a hard disk, for example. The computer system shown in FIG. 1 is also connected through connections 26 to a network 2, which in the illustrated embodiment is the Internet but may be a local or wide area dedicated or private network, for example. The network may provide secure communications through the connections 26. A program implementable by a computer system may also be supplied on a telecommunications medium, for example over a telecommunications network and/or the Internet, and embodied as an electronic signal. For a client computer system 11 operating as a mobile terminal over a radio telephone network, the telecommunications medium may be a radio frequency carrier wave carrying suitably encoded signals representing the computer program and data or information. Optionally, the carrier wave may be an optical carrier wave for an optical fiber link or any other suitable carrier medium for a land line link telecommunication system.

Figure 2:
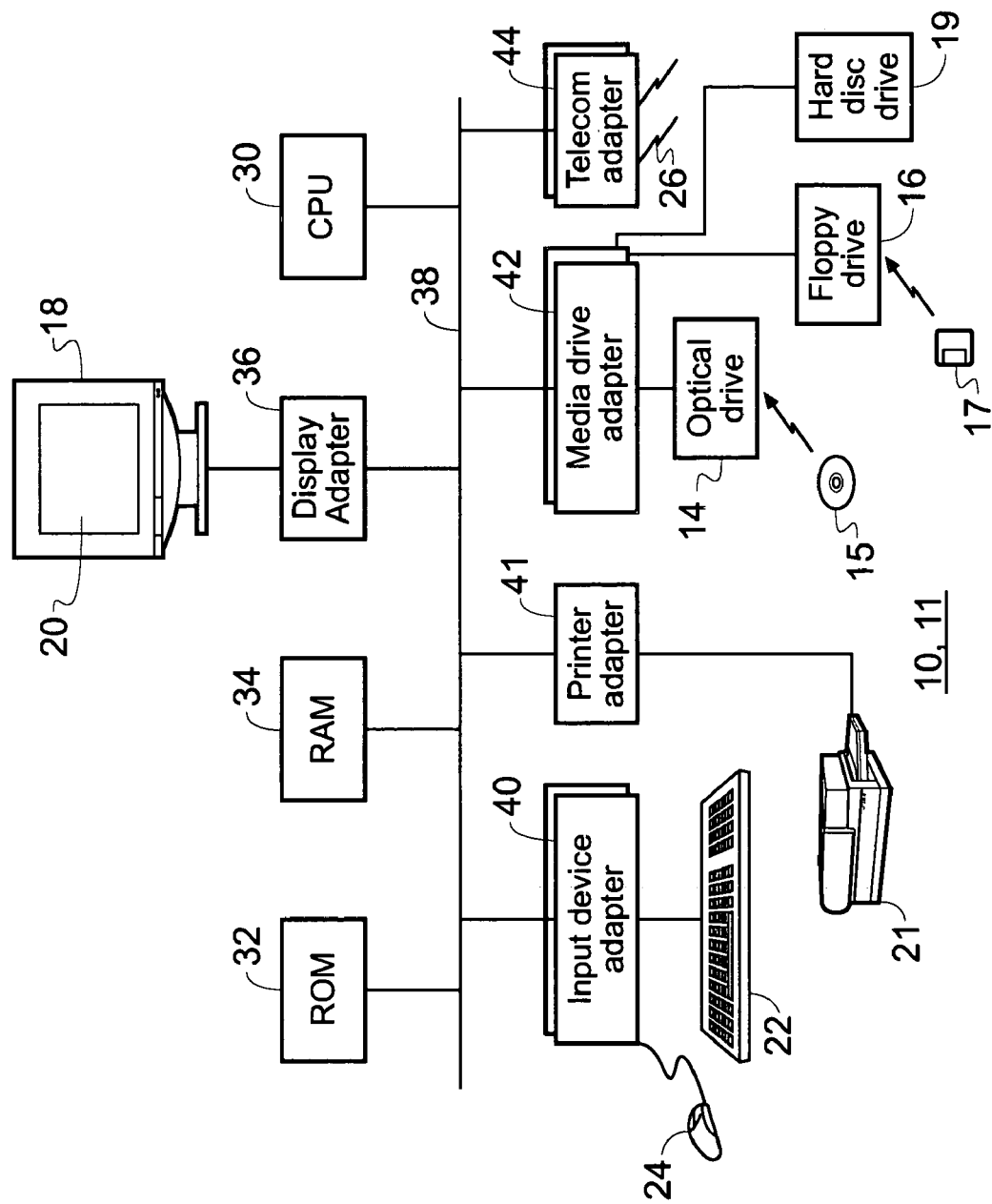
FIG. 2 shows a schematic representation of a computer system usable to implement embodiments according to the present invention.

Referring now to FIG. 2, there is shown a schematic and simplified representation of an illustrative implementation of a data processing apparatus in the form of a computer system such as that referred to with reference to FIG. 1. As shown in FIG. 2, the computer system comprises various data processing resources such as a processor (CPU) 30 coupled to a bus structure 38. Also connected to the bus structure 38 are further data processing resources such as read only memory 32 and random access memory 34. A display adaptor 36 connects a display device 18 to the bus structure 38. One or more user-input device adapters 40 connect the user-input devices, including the keyboard 22 and mouse 24 to the bus structure 38. An adapter 41 for the connection of the printer 21 may also be provided. One or more media drive adapters 42 can be provided for connecting the media drives, for example the optical disk drive 14, the floppy disk drive 16 and hard disk drive 19, to the bus structure 38. One or more telecommunications adapters 44 can be provided thereby providing processing resource interface means for connecting the computer system to one or more networks or to other computer systems. The communications adapters 44 could include a local area network adapter, a modem and/or ISDN terminal adapter, or serial or parallel port adapter etc, as required.

It will be appreciated that FIG. 2 is a schematic representation of one possible implementation of a computer system, suitable for one or more of a server computer system 10 and a client computer system 11. It will be appreciated, from the following description of embodiments of the present invention, that the computer system in which the invention could be implemented, may take many forms. For example, rather than the server computer system 10 comprising a display device 18 and printer 21, it may be merely necessary for the server computer system 10 to comprise a processing unit, and be accessible by client computer systems 11. The client computer may also be a non-PC type of computer which is Internet- or network-compatible, for example a Web TV, or set-top box for a domestic TV capable of providing access to a computer network such as the Internet.

Optionally, the client computer may be in the form of a wireless personal digital assistant (PDA), wireless application protocol (WAP) enabled telephone or a multimedia terminal.

Each computer system 10, 11 has a unique address within the Internet and within the terminology of the World Wide Web (WWW) these addresses are known as Uniform Resource Locators (URLs). Additionally, each entity within the WWW may also have a unique address or URL. An entity may comprise many different types of information, for example text, graphics, audio, video etc and may therefore be referred to as a hypermedia document or entity.

WWW software is based on client-server architecture. A web client, for example a browser, is a computer program which can send requests to a web server. These requests may be requests for information or requests to initiate certain tasks, such as transaction processes, for example. Often, for reasons of security, the requests and any responses to the requests are dispatched between a client computer system 10 and a server computer system 11 over a secure link, such as one created using a secure sockets layer (SSL) protocol, for example. A web server is a program which sends responses to requests from a client. The web server resides on a server computer system 10. The response received by the client is stored by a client computer system 11, typically on hard disc drive 19. The client program typically resides on hard disc drive 19 of the client computer system 11 and is operable to configure client computer system 11 to interface with the Internet and WWW.

Figure 3:
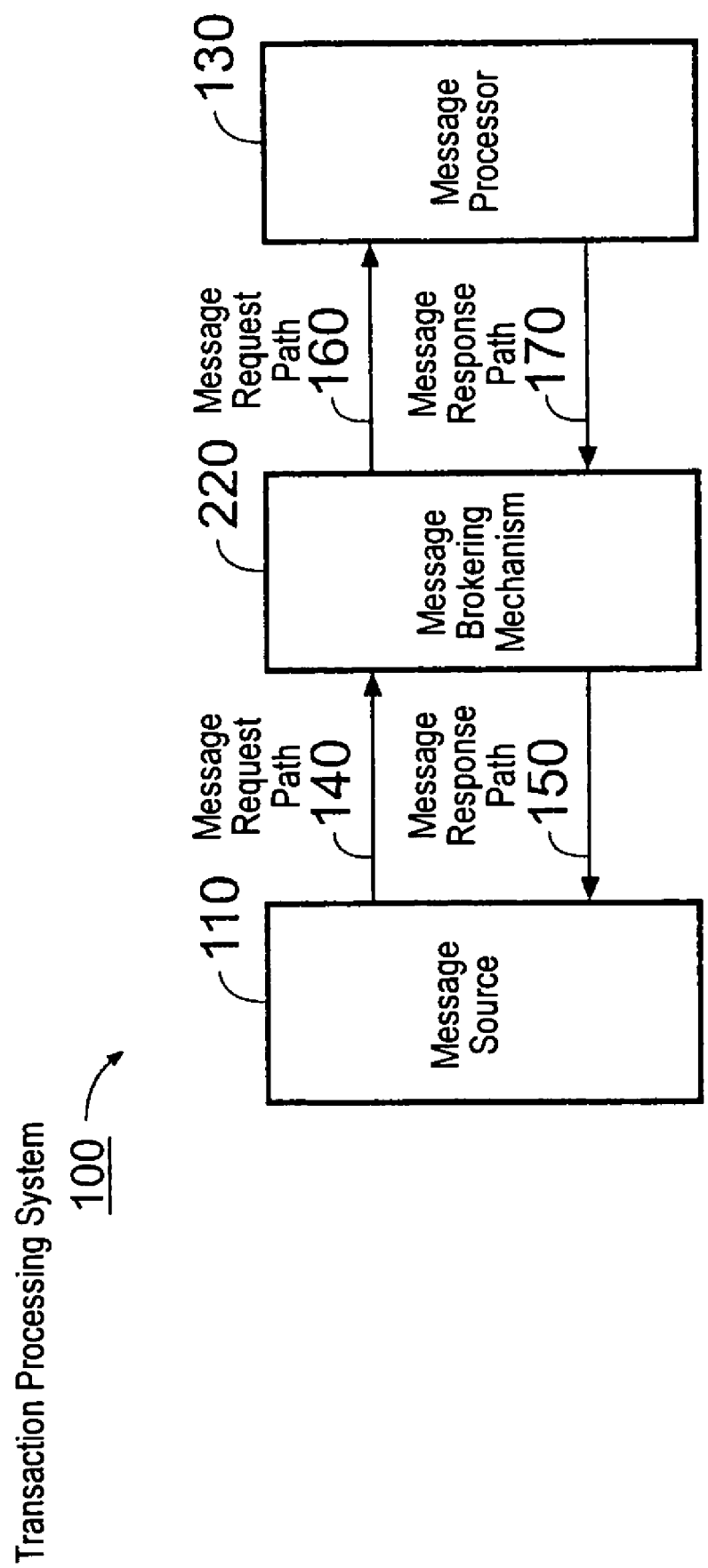
FIG. 3 shows a schematic representation of a transaction processing system comprising a message brokering mechanism.

FIG. 3 shows a schematic representation of a transaction processing system 100 comprising a message source 110, a message brokering mechanism 220 (see the various descriptions below) and a message processor 130. The message source 110 communicates message requests to the message brokering mechanism 220 along a message request path 140. The message brokering mechanism 220 is operable to dispatch responses to the message requests back to the message source 110 along a message response path 150. The message brokering mechanism 220 is also operable to dispatch the message requests received from the message source 110 to the message processor 130 along the message request path 160, and to receive responses from the message processor 130 along the message response path 170. The message brokering mechanism 220 is also operable to implement a recovery process upon receiving a recovery process activating message.

The message brokering mechanism 220 checks the attributes associated with a message request it receives from the message source 110. If the attributes indicate that the message request is not part of a request to start a recovery process, i.e. a normal message request, the message brokering mechanism 220 checks whether the message request already has an associated response. Where a duplicate, or repeat, message request is received for which there is already an associated response (herein referred to as a duplicate message request), that associated response is dispatched to the message source 110 along the message response path 150. The message processor 130 is thus shielded from duplicate, or repeat, requests allowing more productive use of message processor 130 processing time.

Message requests which have not already been dispatched to the message processor 130 are dispatched along the message request path 160 if the message attributes indicate they are normal message requests. When the message processor 130 has received and/or processed the message requests, it sends an acknowledgement, possibly with further data, back to the message brokering mechanism 220 along the message response path 170. Responses received from the processor 130 by the message brokering mechanism 220 are then sent back to the message source 110 along the message response path 150.

In the case where the attributes indicate that the message request is a request to start a recovery process the message brokering mechanism 220 identifies any message requests for which there is no response indicating that the message request has been fully dealt with, such as only an "in progress" response or no response at all, converts them to special messages and dispatches those requests back internally so that they are handled as if they were message requests originating from the message request path 140. By changing the message requests to be special messages, they are not blocked by a first stage of the message brokering mechanism 220 for being repeat message requests. The message brokering mechanism 220 then dispatches any of the requests that have not been sent to the message processor 130 for processing. Any requests that have already been sent to the message processor 130 are noted, and if within a fixed time period there is no response, they are recorded so that they can be dealt with manually. During the recovery process, the message brokering mechanism 220 is still available to handle any other message requests it receives. The message processor 130 is also screened from repeat message requests.

The recovery process can be initiated remotely, for example by a message dispatched over the Internet by a user having appropriate authorization. Message requests can also include trust-based hierarchically certified certificates that are used to verify the identity of the user with varying degrees of certainty. One way of providing trust-based certificate handling and management is to use a trust-based transaction manager (TTM), such as the iPlanet™ Trustbase™ Transaction Manager, available from Sun Microsystems, Inc. The TTM can form part of a message brokering mechanism. The recovery process could also, or alternatively, be initiated manually by an administrator and/or automatically using timed or polled recovery requests.

In one example embodiment of the transaction processing system 100, the message source 110 is a client computer system 11 (See FIGS. 1 and 2). The client computer system 11 uses a web-browser program to send message requests to a server computer 10 using a secure link 140 through the network 2. The server computer 10 implements the message brokering mechanism 220 in software. The server computer is further connected to a message processor 130 through a private banking network in which message response paths 170 and message request paths 160 are created. The server computer 10 screens the message processor 130 from repeat message requests and logs all message requests and responses it receives. In addition, the server computer 10 uses a web server program to dispatch responses to message requests received from the message processor 130 back to the message source 110 over a secure link 150 through the network 2. A transaction recovery process is initiated by sending a message request having a set recovery initiation attribute from the client computer system 11 to the message brokering mechanism 220 over the secure link 140.

In another example embodiment of the transaction processing system 100, a first stage 221 (see FIGS. 5 to 9, for example) of the message brokering mechanism 220 resides on a portable data processing device (such as, for example, a laptop computer, a PDA, a WAP-enabled mobile telephone, or personal organizer) that acts as a message source 110. The first stage 221 communicates with a second stage 222 of the message brokering mechanism 220 through a radio link, such as a cellular telephone link. The second stage 222 of the message brokering mechanism 220 forms part of the radio link's message control service. A user can initiate a recovery process by sending a request message to the first stage 221 on the portable data processing device. Use of the message brokering mechanism 220 in this embodiment allows a user of the portable data processing device to initiate a recovery of the transaction processing system 100 from a remote location without needing to physically access it.

Figure 4:
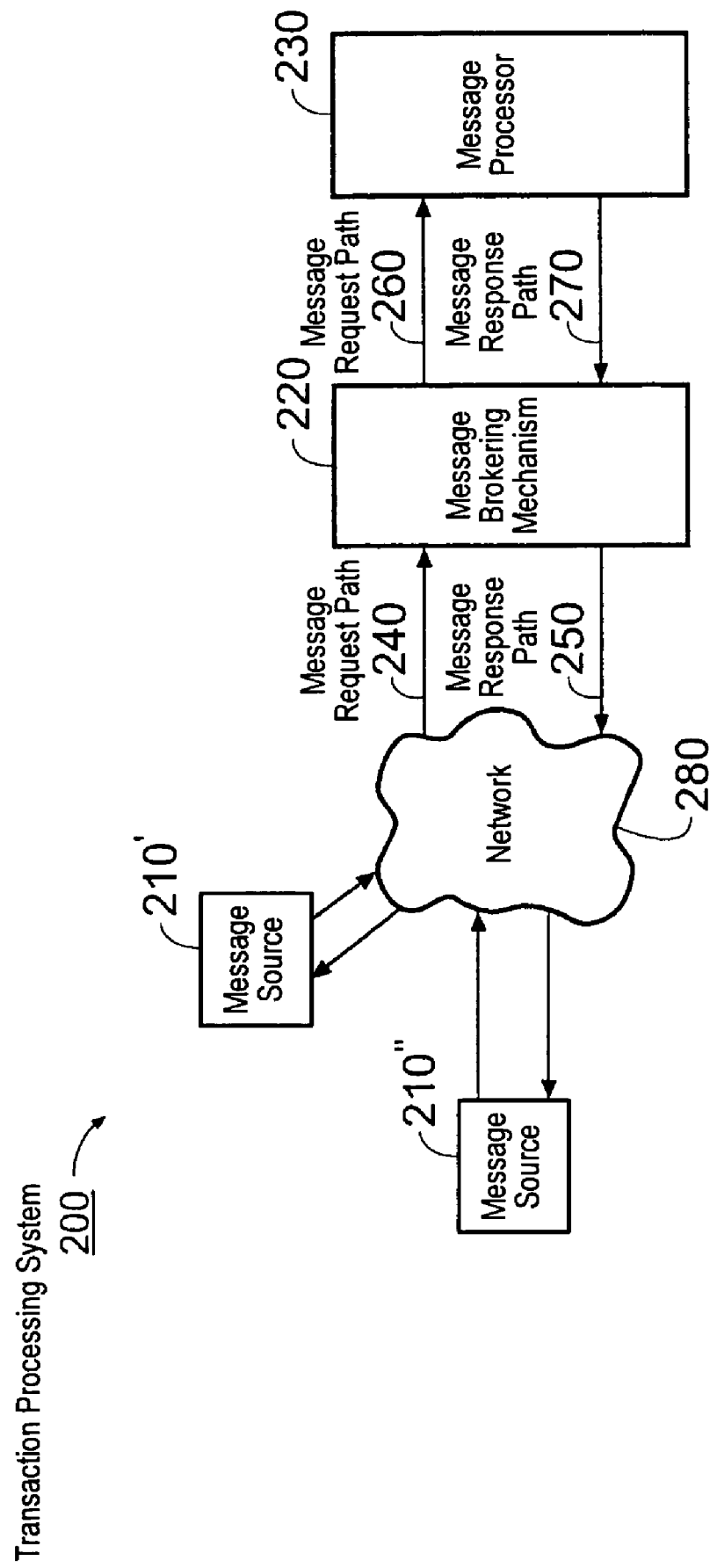
FIG. 4 shows a schematic representation of a transaction processing system comprising a message brokering mechanism.

FIG. 4 shows a schematic representation of a transaction processing system 200 comprising a message brokering mechanism 220. The transaction processing system 200 comprises at least one message source 210', 210" (two are shown for illustrative purposes only) connected to a network 280 (such as the Internet), a message brokering mechanism 220 (see the various descriptions below) connected to the network 280, and a message processor 230 connected to the message brokering mechanism 220. The message sources 210', 210" can communicate message requests to the message brokering mechanism 220 along a message request path 240 that passes over the network 280. The message sources 210', 210" can also communicate with each other over the network 280. The message brokering mechanism 220 is operable to dispatch responses to the message requests back to an originating message source, such as message source 210', along a message response path 250 that passes over the network 280. The message brokering mechanism 220 is operable to dispatch a message request received from the originating message source 210' to the message processor 230 along the message request path 260, and to receive responses from the message processor 230 along the message response path 270. The message brokering mechanism 220 is also operable to implement a recovery process upon receiving a recovery process activation message.

The message brokering mechanism 220 checks the attributes associated with a message request it receives from the originating message source 210'. If the attributes indicate that the message request is not part of a request to start a recovery process, i.e. a normal message request, the message brokering mechanism 220 checks whether the message request already has an associated response. Where a duplicate message request is found for which there is already an associated response, that response is dispatched to the originating message source 210' along the message response path 250. The message processor 230 is thus shielded from duplicate, or repeat, requests allowing more productive use of message processor 230 processing time. Message requests which have not already been dispatched to the message processor 230 previously are dispatched along the message request path 260 if the message attributes indicate that they are normal message requests. When the message processor 230 receives the message requests they are processed by the message processor 230. Before the message requests are processed the message processor can acknowledge receipt of the message requests, possibly by sending a response message to the message brokering mechanism 220 indicating that the message is being, or is about to be, processed. Once the message request has been processed, the message processor 230 sends an acknowledgement response, possibly with further data, back to the message brokering mechanism 220 along the message response path 270. The acknowledgement response can indicate whether a particular message request has been successful or not. Responses received from the processor 230 by the message brokering mechanism 220 are then sent back to the originating message source 210' along the path 250.

In the case where the attributes indicate that the message request is part of a recovery process, the message brokering mechanism 220 identifies any message requests for which there is no response indicating that the message request has been fully dealt with, such as only an "in progress" response or no response at all, sets the message recovery attribute and dispatches those requests back internally so that they are handled as if they were message requests originating from the message request path 240. The message brokering mechanism 220 then dispatches any requests that need to be re-dispatched to the message processor 230 for processing. During the recovery process, the message brokering mechanism 220 is still available to handle any other message requests it receives.

The recovery process can be initiated remotely, for example by a message dispatched over the Internet by a user having appropriate authorization. A user identity may be verified by using a TTM, as part of the message brokering mechanism 220. The recovery process can be initiated manually by an administrator and/or automatically using timed or polled recovery requests.

The following example of a transaction processing system 200 serves to illustrate how the transaction system 200 can work in practice. In this example, the originating message source 210' is a data processing apparatus (e.g. a computer, such as a client computer system 11) configured to manage payments as part of a retailer's electronic commerce web site. The retailer's data processing apparatus 210' is configured to request authorization for payments in response to requests received over the network 280 from an operator, or user, of the message source 210" requesting the provision of goods and/or services from the retailer in exchange for payment. The message source 210" in this example is also a data processing apparatus (e.g. a computer, such as a client computer system 11) connected to the WWW as described previously. The user generates a payment request at the message source 210" through a web-browser interface by entering details of their desired purchase(s) and credit card, or other payment, details. The payment request is sent to the retailer's data processing apparatus 210' through the network 280 using a secure link. In order to validate any particular payment request, a normal message request comprising the user payment details (such as account number, card expiry date, the sum to be paid, time and date information etc.) is formulated by the retailer's data processing apparatus 210'. The message request can also include trust-based hierarchically certified certificates that are used to verify the identity of the retailer and/or user with varying degrees of certainty.

The message request is dispatched from the retailer's data processing apparatus 210' over the message request path 240 to an appropriate banking system using a secure link. The banking system implements the message brokering mechanism 220 as, for example, an add-on to a TTM operating on a transaction controller server (see FIG. 7, for example). The transaction manager and the message brokering mechanism 220 may be implemented using logic components (such as hardware, software and/or firmware modules) as part of a distributed processing system. One example of such a distributed processing system uses a symmetric multiprocessing scheme, whereby different message requests are handled by different processors to achieve load balancing in the banking system.

In another example, a server computer system 10 acts as a gateway to a banking system. Software operating on the server computer system 10 provides a first stage 221 (see FIGS. 5 to 9, for example) of the message brokering mechanism 220, and controls routing of message requests and responses to payments services implemented on the banking system, this includes any reformatting of message requests and responses that is necessary. The banking system may comprise a further private network, access to which is controlled by a private network server which may also act as a firewall for the private network. Software operating on the private network server implements the payments services and provides the second stage 222 of the message brokering mechanism 220. The payments services control the dispatch of the message requests and responses within the private network, and is operable to dispatch message requests to, and receive responses from, a message processor 230 connected to the private network. In a further example, software operating on the server computer system 10 configures it to act as both the gateway to the banking system and the private network server.

The message brokering mechanism 220 checks whether the message request it receives from the retailer's data processing apparatus 210' is part of a recovery process, i.e. if it is a special message request, and if it is not a special message request whether there is already an existing associated response to the message request. Existing responses to message requests are records of message response content that have been previously received by the message brokering mechanism 220, these can be maintained in one or more databases maintained by the message brokering mechanism 220. Where the message request is a duplicate message request for which there is already an existing associated response, that existing response is dispatched to the data processing apparatus along the message response path 250. If the message request is a duplicate message request without an associated response, the message brokering mechanism 220 sends an "in progress" message to the retailer's data processing apparatus 210' along the message response path 250 indicating that a response to the message request is not ready for transmission to the retailer's data processing apparatus 210'. A token (e.g. a short numerical data value used to reference a longer text message) indicating that any such "in progress" message has been dispatched is then recorded by the message brokering mechanism 220 in association with an identity of the message request generating it.

Where the message request is not a duplicate message request, it is dispatched by a first stage 221 of the brokering mechanism 220 to the TTM. The TTM can be configured to provide responses to the retailer's data processing apparatus 210' through the message brokering mechanism 220 by rejecting any authorization for payment if one or more of the user and retailer certification is not valid or is not authorized to a sufficiently high level of trust, and any such response is recorded by the message brokering mechanism 220 as a new existing response to the corresponding message request. Existing responses to message requests are records of message response content that have been previously received by the message brokering mechanism 220, these can be maintained in one or more databases maintained by the message brokering mechanism 220. If the TTM authorizes the message request for transmittal to the message processor 230, it is packaged by the TTM for dispatch along the message request path 260.

The message processor 230 can be a legacy system (e.g. a mainframe computer system or other system predating the message brokering mechanism) that connects to the message brokering mechanism 220 through a private network that forms part of the banking system. In this case, the private network is used to provide both the message request path 260 and the message response path 270, and reformatting and/or repackaging of the message may be necessary in light of the architecture of the private network and/or the legacy system.

When the message request is dispatched to and/or received by the message processor 230, a message indicating that the request message is "in progress" is dispatched by the message brokering mechanism 220 to the retailer's data processing apparatus 210'. This lets the retailer's data processing apparatus 210' know that the message request is being actioned, and frees it to perform other tasks. The chance of the retailer's data processing apparatus 210' producing repeat message requests is also lessened by this action. A token indicating that the "in progress" response has been dispatched is recorded by the message brokering mechanism 220 to represent a new existing response.

When the message processor 230 has finished processing the message request, it can return one of numerous possible responses in reply to the request for payment authorization. If the request is approved, the message processor 230 can transfer funds from the user's account to the retailer's account and send a response to the retailer's data processing apparatus, through the message brokering mechanism 220, indicating that the message request has been actioned. Whatever the response, it is recorded by the message brokering mechanism 220 as a new existing response. A response approving the request usually provides a transaction authorization code to the retailer, the receipt of which will allow the retailer to provide the user with the requested goods and/or services. If the user has insufficient credit, funds etc. the request can be refused or authorized only at a lower monetary limit. A message indicating that the request has been refused, or conditions under which a transaction would be possible, is dispatched from the message processor 230 to the message brokering mechanism 220 and then back to the retailer's data processing apparatus 210'. The retailer's data processing apparatus 210' then informs the message source 210" of the outcome of the request by dispatching a further message across the network 280.

The recovery process can be initiated by sending a special message request to the message brokering mechanism 220. Such messages are identified by the message brokering mechanism 220 upon receipt. During the recovery process, the message brokering mechanism 220 identifies any message requests for which there is no response indicating that the message request has been fully dealt with, such as only an "in progress" response or no response at all, sets the recovery attribute for each of those message requests and dispatches those requests back into itself as if they originate from the message request path 240. The message brokering mechanism 220 then identifies any requests needing to be re-dispatched to the message processor 230 and starts a timer process. The timer process waits for a certain time period and then checks if the requests needing to be re-dispatched to the message processor 230 still have no response. Where there is no response, the requests needing to be re-dispatched to the message processor 230 are logged to be handled manually. During the recovery process, the message brokering mechanism 220 is still available to handle any other message requests it receives.

Figure 5:
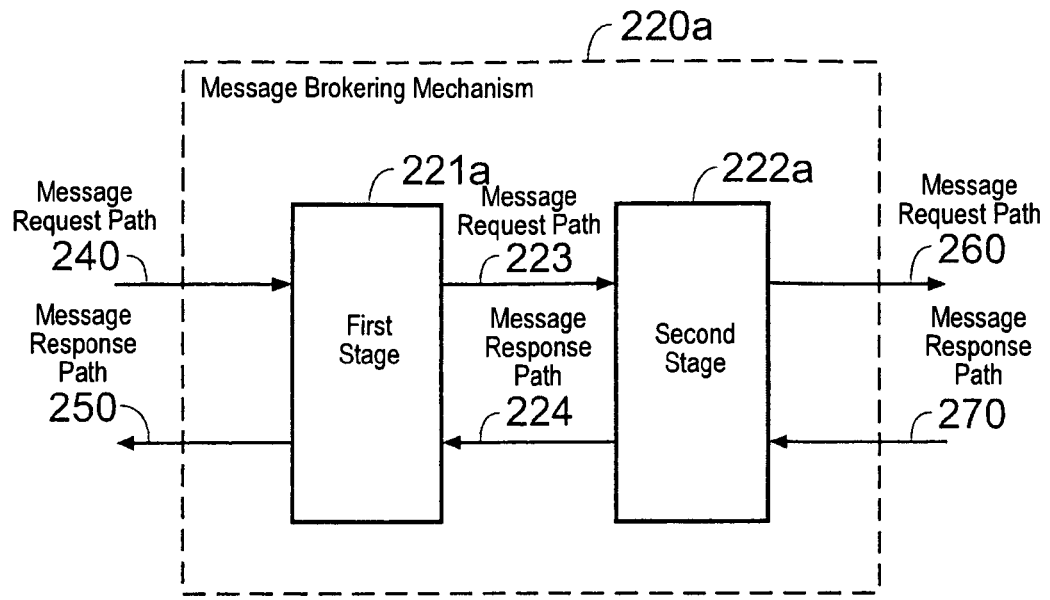
FIG. 5 shows a schematic logical representation of a message brokering mechanism.

FIG. 5 shows a schematic logical representation of a message brokering mechanism 220a. The message brokering mechanism 220a comprises a first stage 221a and a logically separate second stage 222a. The first stage 221a is configured to accept message requests from a message request path 240 and to dispatch responses to such message requests to a message source along a message response path 250. The first stage 221a is operably coupled to the second stage 222a. Message requests can be sent from the first stage 221a to the second stage 222a along a message request path 223 (also see, e.g., 223c, 223d, and 223e). Responses to message requests can be sent to the first stage 221a from the second stage 222a along a message response path 224 (also see, e.g., 224c, 224d, and 224e). The second stage 222a is configured to accept message responses from a message response path 270 and to dispatch message requests received from the first stage 221a along a message request path 260.

The first stage 221a receives message requests from the message request path 240 and checks a recovery attribute of the message request. This check can be performed by a recovery attribute flag appended to the message response. When this flag is set, the message request is identified as a special message request, otherwise the message request is identified as a normal message request. The first stage 221a maintains a record of all previously received message requests, including any special message requests it receives. If the message request is a special message request it is dispatched by the first stage 221a to the second stage 222a without further intervention by the first stage 221a. The second stage 222a receives the special message request and checks to see if there is an associated second stage response corresponding to the special message request. If there is such a second stage response that does not represent an "in progress" state, it is dispatched back to the first stage 221*a*. If there is no such second stage response the second stage starts a timer process, waits for a completed second stage response and logs the special message request in a log of failed requests needing manual intervention.

Where the message request is a normal message request, the first stage checks whether the message request has been previously received by the first stage 221*a*. The check is performed, for example, by calculating a message digest from the message request and comparing it to a database of message digests recorded for all previously received non-duplicate message requests. Where there is no match, the new message digest is stored in the database of message digests and the message request is dispatched to the second stage 222*a*. Where there is a match, the first stage 221*a* checks whether there is an existing response to the message request that has been previously received by the first stage 221*a*. This check can be performed, for example, by using the message digest to index a database table having responses (or indicators of responses such as, for example, a token representing the "in progress" state) as table entries. If the database entry indexed by the message digest contains an existing response, that response is dispatched along the message response path 250. If there is a match indicating that the message request has been previously received by the first stage 221*a* but no existing response, an "in progress" message can be dispatched along the message response path 250.

Second stage 222*a* checks may be performed by comparing a message digest generated from the message request to entries in a second database of message digests recorded for all non-duplicate message requests previously received by the second stage. For normal message requests, the second stage 222*a* checks for an existing response and dispatches any existing responses to those requests back to the first stage 221*a* along the message response path 224. For special message requests, the second stage 222*a* dispatches only final responses (i.e. those responses indicating that they have been processed by a message processor) to repeat requests back to the first stage 221*a* along the message response path 224. Non-repeat normal message requests are logged in the second database and dispatched along the message request path 260 for processing. Repeat special message requests may also be logged in the first or second database. The responses received by the second stage 222*a* are logged in the second database with their associated message digest acting as an index. Thus this embodiment provides two-stage screening in which the first stage 221*a* provides screening for normal message requests and the second stage 222*a* provides screening for special requests if those special requests represent completed transactions.

Either one or both of the first and second stages 221*a*, 222*a* may be configured to dispatch a message indicating that a request is "in progress". To do this the respective stage may check the respective database entry corresponding to the message digest. Where a matching message digest is found for which there is no database entry corresponding to the message digest, an "in progress" message can be generated for dispatch and a token entered into the corresponding database entry. Should the same message database entry be accessed thereafter, the token indicates that an "in progress" response has already been sent. The tokens can be overwritten with the content of any further responses received, such as a final response received once processing of the corresponding message request is complete.

Message responses are dispatched along the message response paths 224, 250, 270 along with an identifier that enables the stages and the message source to identify which message request produced the response. The identifier may be a message digest of the original message request appended to the message response.

The first stage 221*a* and the second stage 222*a* can be implemented as logic modules using any one or more of hardware, software and firmware components or modules (as will be appreciated by those skilled in the art). Some example embodiments are discussed above. In one example embodiment, the first stage 221*a* is implemented in firmware as part of a handheld communications device, the message request path 223 and message response path 224 form part of a wireless telecommunications link, and the second stage 222*a* is implemented in software and forms part of a telecommunications message handling service in a receiving station. In another example embodiment, the first and second stages 221*a*, 222*a* are implemented by co-operating software services, operating on a distributed symmetric multiprocessing system. In a further example embodiment, the first stage 221*a* is implemented as a software service (e.g. executing on a data processing apparatus) on the outside of a firewall server and the second stage 222*a* is implemented as a software service within the firewall server. This latter embodiment allows repeat messages request to be handled by the first stage 221*a* without them re-entering a firewall secured area.

Figure 6:
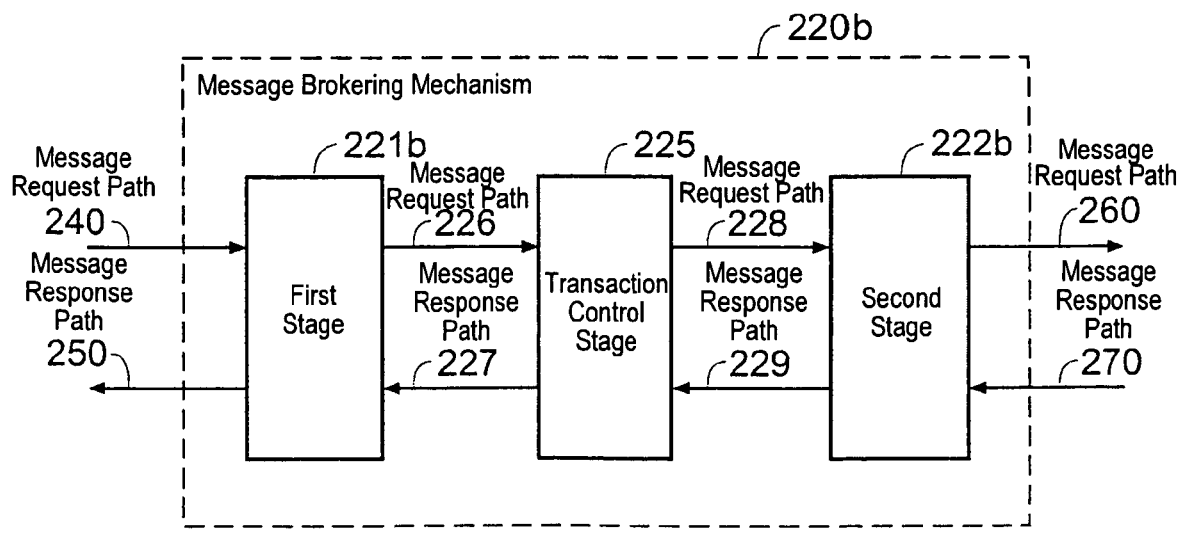
FIG. 6 shows a schematic logical representation of a message brokering mechanism.

FIG. 6 shows a schematic logical representation of a message brokering mechanism 220*b*. The message brokering mechanism 220*b* comprises a first stage 221*b* that communicates with a logically separate second stage 222*b* through a transaction control stage 225. The first stage 221*b* is configured to accept message requests from a message request path 240 and to dispatch responses to the message requests to a message source along a message response path 250. The first stage 221*b* is functionally coupled to the transaction control stage 225. Message requests can be sent from the first stage 221*b* to the transaction control stage 225 along a message request path 226. Responses to message requests can be sent to the first stage 221*b* from the transaction control stage 225 along a message response path 227. The transaction control stage 225 is functionally coupled to the second stage 222*b*. Message requests can be sent from the transaction control stage 225 to the second stage 222*b* along a message request path 228. Responses to message requests can be sent to the transaction control stage 225 from the second stage 222*b* along a message response path 229. The second stage 222*b* is configured to accept message responses from a message response path 270 and to dispatch message requests received from the transaction control stage 225 only once along a message request path 260.

The first and second stages 221*b*, 222*b* can function in identical ways to the various first and second stages 221*a*, 222*a* described above in connection with FIG. 5. However, the interposition of the transaction control stage 225 provides the message brokering mechanism 220*b* with extra functionality. In one embodiment, the transaction control stage comprises a TTM that provides message authentication and security functions through the screening of message requests, responses and certificates. The TTM may also provide transport functions such as reformatting or tunnelling of message requests and responses in order that communication can be achieved with legacy systems and/or networks, such as, for example, those often found in conventional banking systems. The TTM may also be included as part of the banking system.

Figure 7:
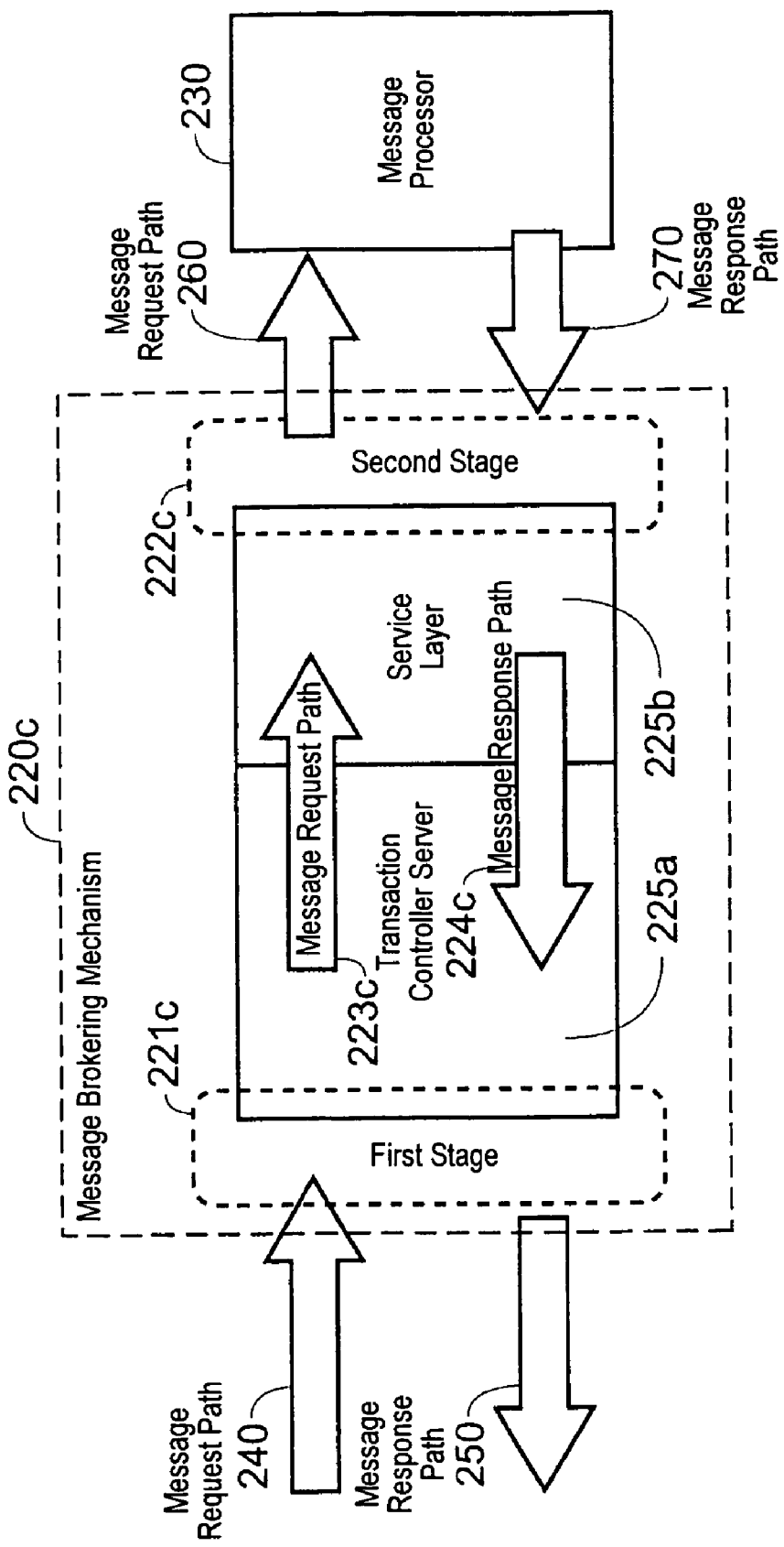
FIG. 7 shows a schematic logical representation of a message brokering mechanism in communication with a message processor.

FIG. 7 shows a schematic logical representation of a message brokering mechanism 220*c*, in communication with a message processor 230. The message brokering mechanism 220*c* is similar to the message brokering mechanism 220*b* shown in FIG. 6 and described above.

The first stage 221c communicates message requests and responses to the second stage 222c through a transaction control mechanism comprising a transaction controller server 225a configured to use a service layer 225b. The second stage 222c is operable to dispatch message requests to the transaction processor 230 along the message request path 260 only once, and to receive responses from the transaction processor 230 along the message response path 270.

The transaction controller server 225a is a platform (which may be implemented as services, modules, plug-ins, personalities, extensions etc. operating on a processing system that may be a distributed system) that provides transport, authentication and security functions. In a further embodiment, the transaction controller server 225a is part of services provided by a TTM which communicates over a private banking network with the message processor 230 using payment services implemented as part of the service layer 225b. Responses generated by the message processor 230 are sent by the second stage 222c via the service layer 225b to the transaction controller server 225a. The transaction controller server 225a may add authentication certificates to the responses before dispatching them to respective message sources via the first stage 221c.

Figure 8:
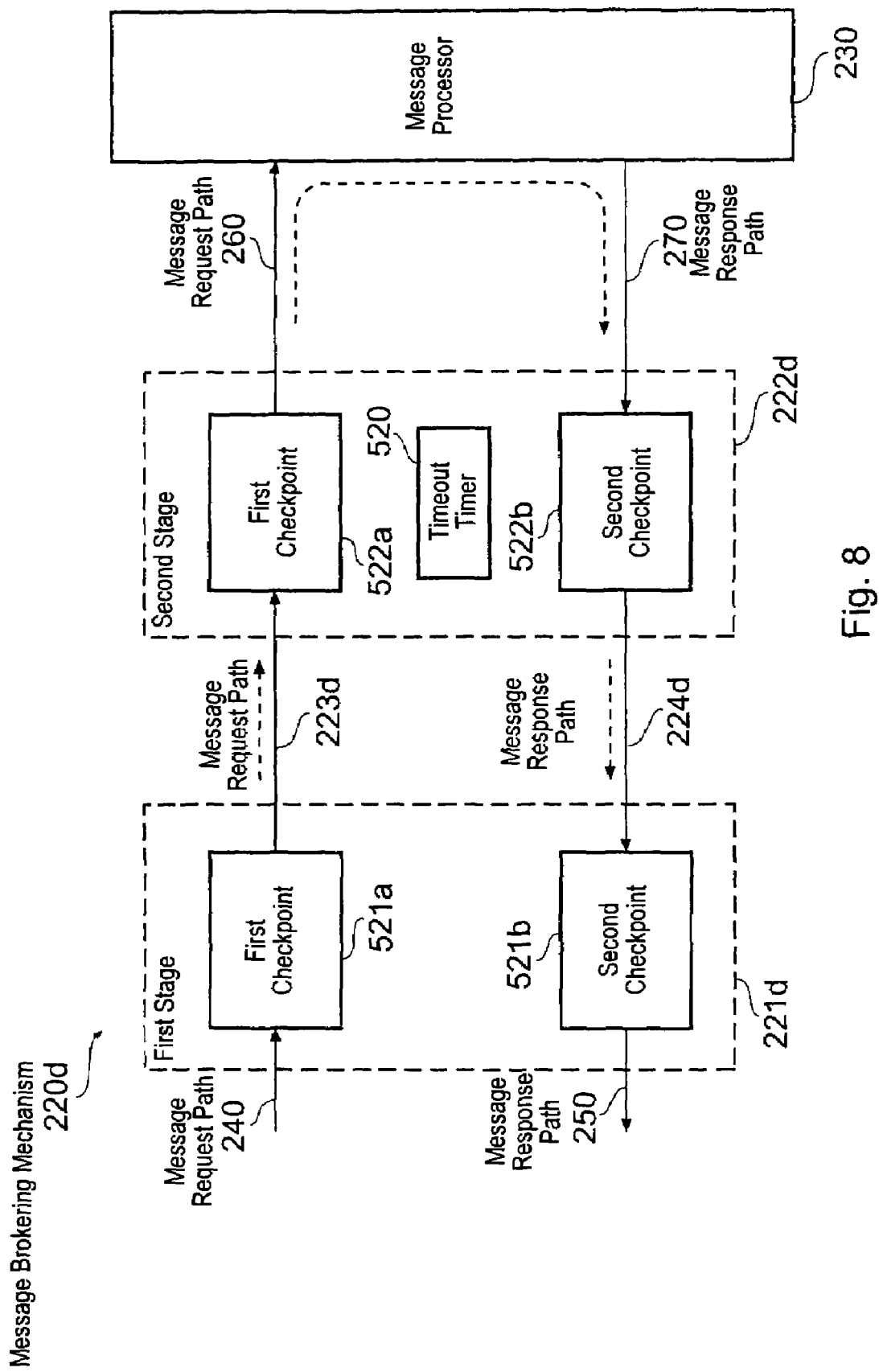
FIG. 8 shows a schematic logical representation of a message brokering mechanism in communication with a message processor.

FIG. 8 shows a schematic logical representation of a message brokering mechanism 220d in communication with a message processor 230. The message brokering mechanism 220d is similar to that shown in FIG. 5, except that the second stage 222d is provided with extra functionality to implement a process for checking for and automatically reinstating message requests that are lost by the message processor 230.

First stage 221d and second stage 222d comprise respective first and second checkpoints 521a, 521b, 522a, 522b. The first checkpoints 521a, 522a (also see, e.g., 621a and 622a) denote logical points in the message brokering mechanism 220d where a check can be performed to determine whether a particular message request has been received previously. The second checkpoints 521b, 522b (also see, e.g., 621b and 622b) indicate logical points in the message brokering mechanism 220d where a check can be performed to determine whether a response to a particular message request has been received previously. In one embodiment the checks are performed by calculating a message digest of the particular message request and comparing it to a database of message digests recorded for all previously received non-duplicate message requests.

When the second stage 222d receives a message request that has not been received previously at checkpoint 522a the message request is dispatched to the message processor 230. The second stage 222d then starts a timeout timer 520 to monitor the time elapsed since the message request was received. If the second stage 222d receives a response from the message processor 230, then that response is checked to determine whether it is an actioned response sent as a final response to the message request. For example, an actioned response may indicate that a payment has been made from one account to another, whereas a non-actioned response may indicate that the payment is still awaiting authorization. When an actioned response is received the timeout timer 520 is instructed to stop monitoring the elapsed time for the message request.

If the timeout timer 520 is allowed to run for a predetermined time period, indicating a timeout event, it indicates to the second stage 222d that a timeout event has occurred and identifies the message request for which that timeout event has occurred. The second stage then dispatches a query message to the message processor 230 requesting the message processor 230 provide further information regarding the message request. If no response to the query message is received within a fixed time period, the second stage 222d logs a request message identifier in a database to await administrator processing or restart. When the message processor 230 receives a query response it checks the identity of the message request and formulates a query reply for sending back to the second stage 222d.

Query replies are formulated according to whether the message request has been received previously by the message processor 230. If the message request has been received before and an actioned response generated, the actioned response is dispatched to the second stage 222d in the query reply. If the message request has been received before but no actioned response has been generated, the query reply instructs the second stage 222d to reset the timeout timer 520. This effectively instructs the second stage 222d to wait for another predetermined time period before checking any further whether an actioned response has been generated by the message processor 230. If the message request has not been received previously by the message processor 230 (e.g. as indicated by the content of a query reply indicating that the message request has never been received by the message processor 230), the message request is deemed lost and can be dispatched again from the second stage 222d to the message processor 230.

Query response information is extracted from the query responses and used by the second stage 222d to provide idempotent functionality to the first stage 221d in a similar manner to the message brokering mechanism of FIG. 5.

In various embodiments a repeat of a lost message request is sent in a further query message from the second stage 222d to the message processor 230. This has the benefit that the repeat message request is supplied to the message processor through a channel that is known to be reliable.

In various embodiments the query message and any query reply are routed over at least one physical path separate from the message request path 260 (e.g. a dedicated communications link) and the message response path 270. This enables the second stage 222d to have a higher probability of being able to interrogate the message processor 230 should the cause of a lost message request be due to the failure of one or more of the message request path 260 and the message response path 270.

In various embodiments the timeout timer 520 is implemented by a process thread that returns a unique identifier identifying the message request after the predetermined time period, such as, for example, 30 seconds. The second stage 222d also records an indication of the time at which the message request was received along with a corresponding message digest identifying the message request in a database.

Figure 9:
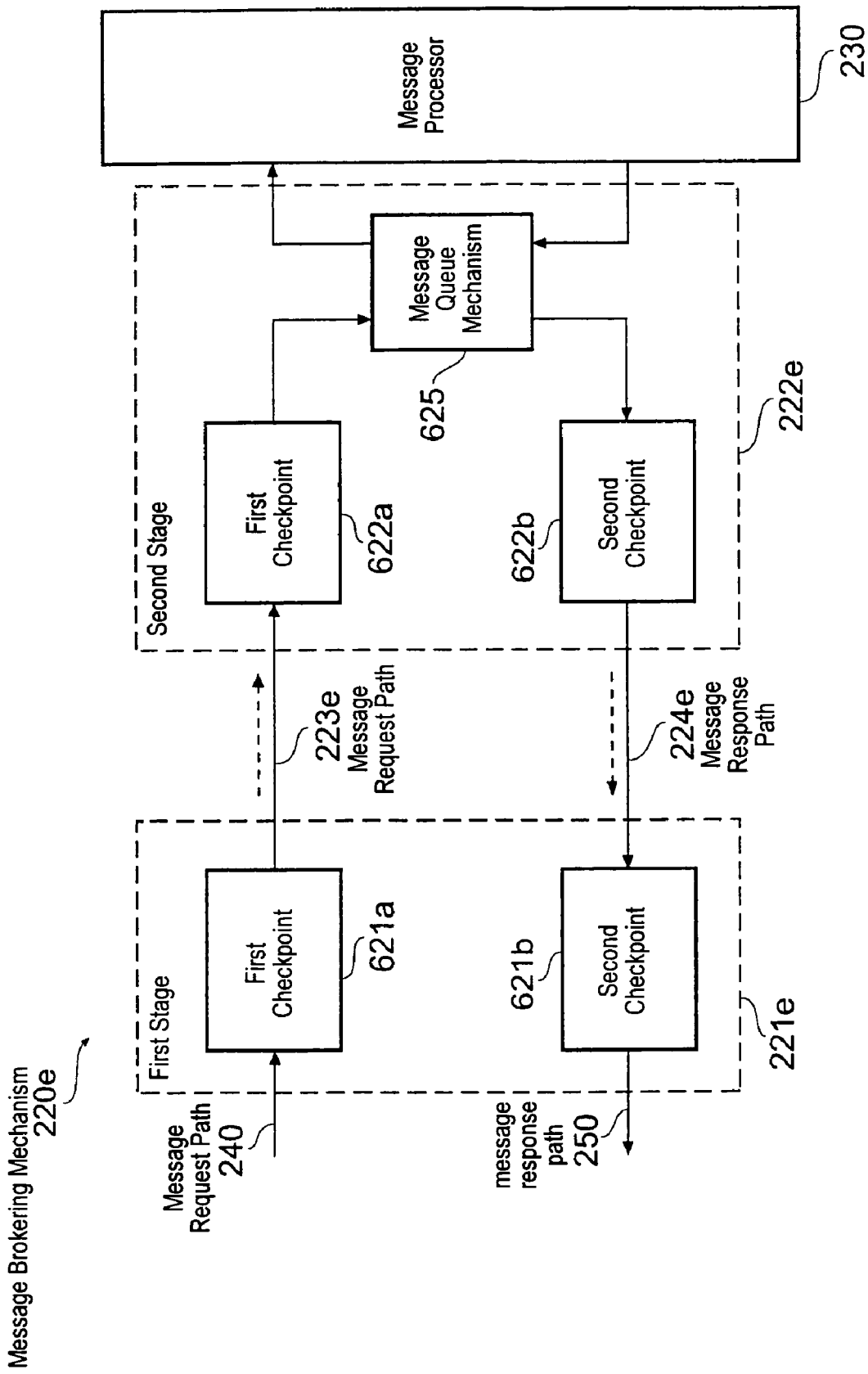
FIG. 9 shows a schematic logical representation of a message brokering mechanism in communication with a message processor.

FIG. 9 shows a schematic logical representation of a message brokering mechanism 220e in communication with a message processor 230. The message brokering mechanism 220e comprises a first stage 221e and a second stage 222e. The message brokering mechanism 220e is similar to that shown in FIG. 5 except that the second stage 222e directs message requests and message responses through a message queue mechanism 625.

The message queue mechanism 625 monitors message requests and responses sent between the second stage 222e and the message processor 230. The message queue mechanism 625 checks if a response is received for a message request within a fixed time period. When no such response is received, the message queue mechanism 625 resends the message request to the message processor.

This message brokering may be used where the message processor 230 is a reliable transactional system.

Figure 10:
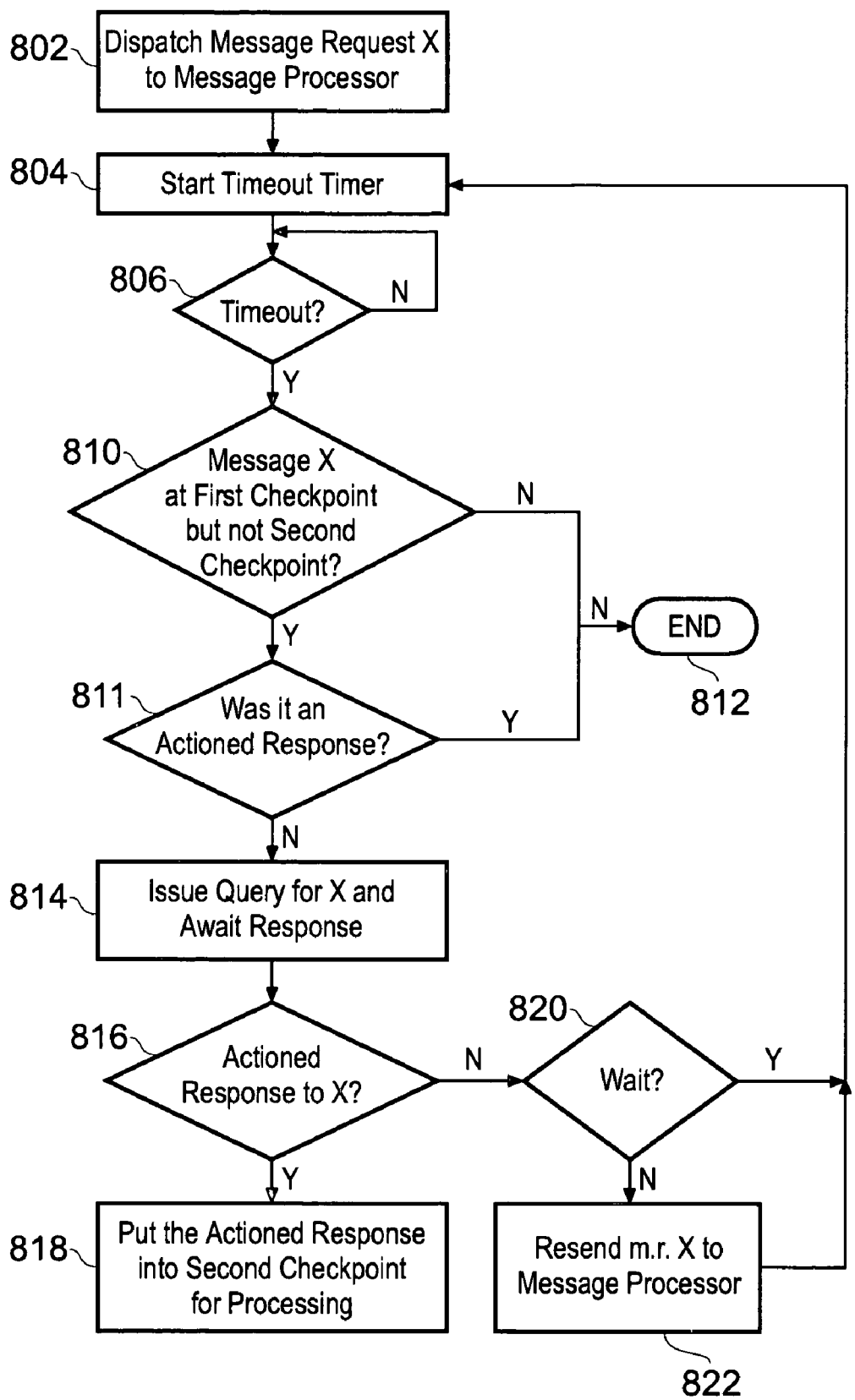
FIG. 10 shows a flowchart showing a process for checking for and automatically reinstating message requests lost by a message processor.

FIG. 10 shows a flowchart showing a process 800 for checking for and automatically reinstating message requests lost by a message processor 230. This method may, for example, be implemented by a thread, object or modular component of a computer program operating on one or more computer system used to provide a message brokering mechanism according to aspects of the invention. For example, the process 800 may be implemented by the message brokering mechanism 220d shown in FIG. 8.

The process 800 monitors the dispatch of a message request (e.g. a message request denoted by X) to a message processor 802. A timeout timer process 804 is begun that indicates the elapsed time period since the message request was received. The process then loops 806 (waits) until it is either terminated by an external process (such as, for example, killed by an operating system command) or until it has been running for a predetermined time period, thereby indicating that a timeout event has occurred.

Where a timeout event does occur, the process checks (at 810) whether the message request has been sent to the message processor but no actioned response received. To perform this step a comparison may be made between the records held at first and second logical checkpoints that hold logs of all request and response message traffic that passes through those checkpoints. Where the comparison reveals that there is an actioned response corresponding to the message request 811, the process terminates 812.

If the comparison reveals that there is no actioned response corresponding to the message request, the process proceeds to formulate a query message (at 814) that can be used to interrogate the message processor. The query message requests that the message processor provide further information regarding the message request. If no response to the query message is received within a fixed time period, the process logs a request message identifier in a database and signals that the message request cannot be automatically reinstated.

When the message processor responds to the query, the content is checked. A check is made 816 to determine whether there is already an actioned response corresponding to the message request. If there is such a response it is extracted from the query response 818 and dispatched to the second logic checkpoint so that its existence may be recorded and subsequently the message response forwarded on. Where there is no actioned response, the process checks 820 the content of the query response to determine if the message processor requires it to wait.

If a wait state is indicated by the query response, the timeout timer is reset and the process continues from step 804. If no wait state is indicated the message request is resent (at 822) to the message processor and the process then continues from step 804.

Figure 11:
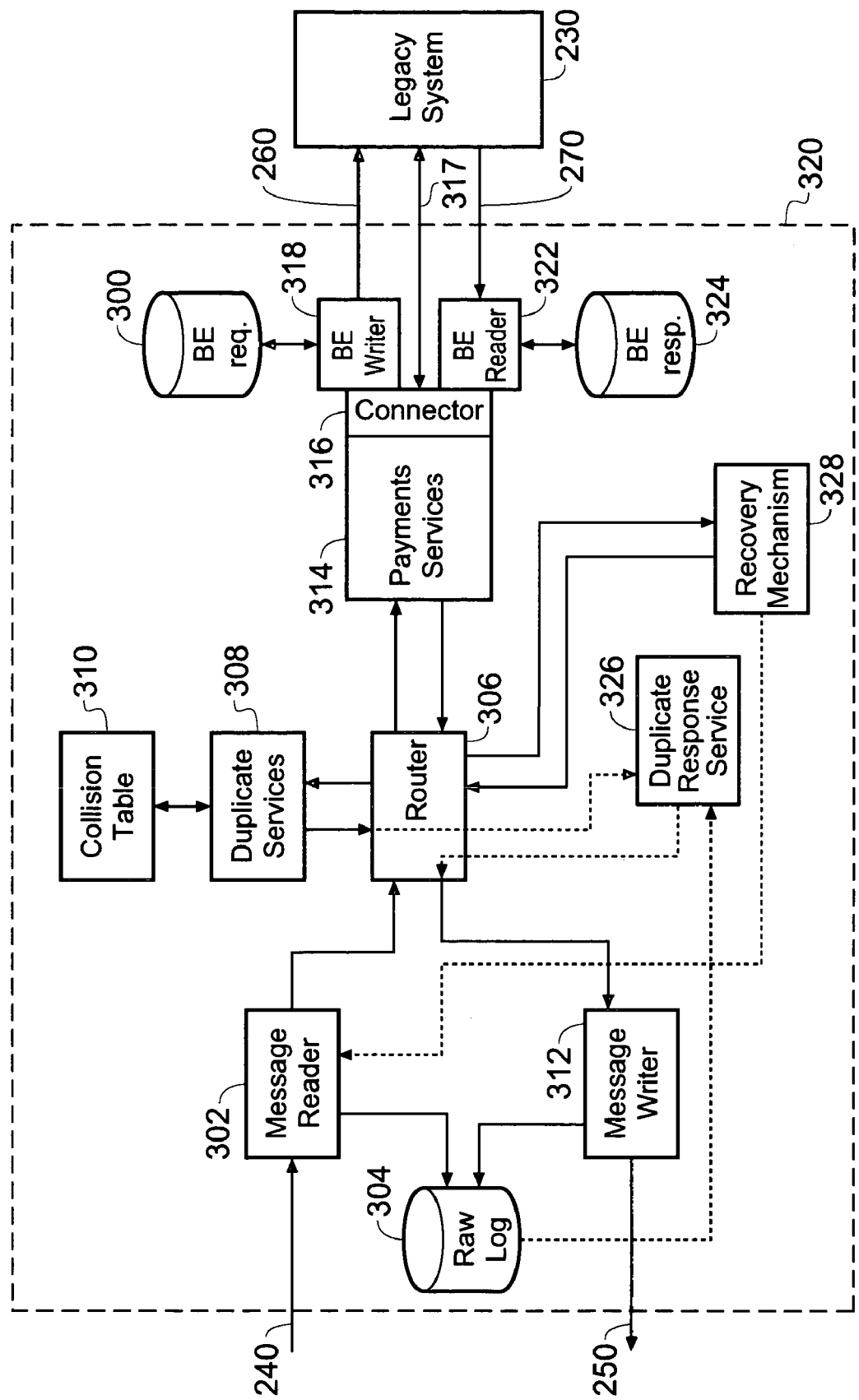
FIG. 11 is a system architecture diagram showing an implementation of a message brokering mechanism according to an embodiment of the present invention.

FIG. 11 is a system architecture diagram showing an implementation of a message brokering mechanism 320 according to an embodiment of the present invention. For example, the architecture can be used to implement any of the message brokering systems shown in FIGS. 3 to 9. The message brokering mechanism 320 can also be used to implement a process for checking for and automatically reinstating message requests lost by a message processor, such as that illustrated in FIG. 10.

A message reader service module 302 receives an incoming message request from message request path 240 and sends a copy of the message request to a raw log database 304 for recordal. The raw log database 304 is a structured query language (SQL) database that is used to record all incoming and outgoing data traffic, including message requests and outgoing responses, along with system time and date information. The raw log database 304 can be configured to check for certain types of entry duplication and may also be used for system administration and auditing purposes.

The message reader service module 302 forwards the message request to a router 306. The router 306 checks a recovery initiation bit transmitted with the message request to determine whether a recovery is being requested, and a recovery attribute bit to decide whether the message request is a normal or special message request. Where neither the recovery attribute bit nor the recovery initiation bit is set, no recovery is being requested and the message is a normal message request.

Where the message request is a normal message request, the router 306 directs the message request to a duplicate services module 308. The duplicate services module 308 can control one or more processes operating on a distributed processing system. Each of these processes can be used to check incoming message requests for duplicates. Where distributed processing is used, the duplicate services module 308 selects an appropriate process to perform the check according to load balancing information collected by the duplicate services module 308 from the distributed services. The duplicate services module 308 dispatches message requests to the least busy process. The process generates a message digest from the message request and checks the message digest against message digest entries of previously received message requests held in a collision table 310. The collision table 310 is a data table to which all the distributed processes have read access, and is maintained centrally by the duplicate services module 308.

Where there is no match between the message request and the records in the collision table 310, the message digest of the message request is written into the collision table 310. An attribute of the message request indicating whether the message request is a duplicate is set to be clear, and the message request dispatched back to the router 306. The router 306 receives the message request and determines from the attributes that the message request is not a duplicate. The message request is then dispatched to a payments services module 314.

The payments services module 314 forms part of a service system for managing payment transactions over a private network. When the message request is received by the payments services module 314 it may be reformatted according to the protocol of the private network, if the private network protocol differs from the protocol used to route the message request to the payments services module 314. The message request is then dispatched through connector services 316 to backend writer services module 318. The payment services module 314 can also manage processes (such as, for example, that illustrated in FIG. 10) for checking for and reinstating lost messages. Further, the payment services module 314 may provide certificate validation and certification services when used in a trust-based payments system.

The backend writer module 318 creates a message digest from the message request and checks an SQL backend request database 300 for any matching message digests that indicate duplicate message requests. Where there is no match indicating a duplicate message request, the backend writer 318 writes the message digest into the backend request database 300 and dispatches the message request along the message request path 260 to the message processing system 230. At this time the payments services module 314 also starts a unique monitor processing thread identifiable by the message digest. Monitor processing threads are described in more detail below in conjunction with checking for and reinstating lost messages. The message processing system 230 can be a banking legacy system, which processes all message requests that it receives.

Once the message processing system 230 has processed the message request, it sends a response, including a message request identifier such as a digest of the message request, along the message response path 270 to a backend reader service module 322. The backend reader service module 322 stores the response in an SQL implemented backend response database 324 and dispatches the response through the connector services 316 to the payments services module 314. The backend response database 324 is logically distinct from the backend request database 300, but the databases 300, 324 may share common data entries.

The payments services module 314 determines whether the response is an actioned response issued in final settlement of the message request by comparing the response held to a list of all possible message responses that are known to be actioned responses. Where an actioned response is found, the payments services module 314 issues a command that causes the unique monitor processing thread to be terminated. E.g. a UNIX™ based operating system may be issued with a "kill-9 xxx" command to terminate the process having process number "xxx".

The payments services module 314 may reformat the response and/or add a validation certificate before dispatching the response to the router 306. Router 306 dispatches the response to a message writer service 312. The message writer service 312 records the response in the raw log database 304 and dispatches the response back to the message source along the message response path 250. The message writer service 312 is configured to record all responses it receives in the raw log database 304, so that the raw log database 304 maintains an accurate sequential record of all the responses sent.

For the case where the backend writer module 318 determines that there is a match indicating a duplicate message request, the backend writer module 318 sets a transport attribute of the message request and dispatches the message request through the connector services 316 to the backend reader module 322. The backend reader module 322 recognizes that the transport attribute is set and calculates a message digest from the message request. A check is then performed by the backend reader module 322 in the backend response database 324 for matching message digests. If no match is found the backend reader module 322 starts a timer process. The timer process waits for a fixed time period for a response to the message request. If no response is forthcoming in this time period the message request times-out and the duplicate request is stored in the backend request database 300 in a log of failed message requests. This log is subsequently examined by a system operator. If a match is found the existing response is copied from the backend response database 324 to form the new response. The new response is then dispatched to the message source in the same way as is described above for responses generated by the message processor 230.

For the case where the duplicate services module 308 determines that there is a match between the message request and a record in the collision table 310, the attribute of the message request indicating whether the message request is a duplicate is set, and the message request dispatched back to the router 306. The router 306 dispatches the message request to a duplicate response service module 326. The duplicate response service module 326 checks the raw log database 304 for any existing response to the message request. If there is at least one existing response, the duplicate response service module 326 sends the most recent response as a new response to the router 306 for dispatch to the message writer service 312. If there is no existing response, the duplicate response service module 326 sends a new response indicating that the message request is "in progress" to the router 306 for dispatch to the message writer service 312. The message writer service 312 records the new response in the raw log database 304 and then dispatches it to the message source along the message response path 250 to the message source.

For the case where the recovery initiation bit is set and a recovery is being requested the router 306 dispatches the message request to a recovery mechanism 328. The recovery mechanism formulates two special request messages. These messages are dispatched to the router 306. A first special request message is dispatched from the router 306 to the duplicate response service module 326. The duplicate response service module 326 checks the raw log database to determine a set of message request entries that have no existing response or only an "in progress" response. This set is returned to the recovery mechanism 328. The second special request message is dispatched from the router 306 to payments services 314. Payments services compares the contents of the backend request database 300 and the backend response database 324 to determine a further set of message requests appearing in the backend request database 300 that have either no corresponding response in the backend response database 324 or a backend response database 324 entry indicating an "in progress" response. This further set of message requests is returned to the recovery mechanism 328 via payments services 314 and the router 306.

The recovery mechanism 328 combines the two sets of message requests in to a single set and sets the recovery attribute bit for all the message requests in the set. The set of message requests is then dispatched directly to the message reader 302 where they are treated like any other received special message requests, as described as follows.

For the case where the recovery attribute bit is set and the message request is a special message request the router 306 dispatches the message request directly to the payment services module 314. Payment services 314 dispatches the message request through connector services 316 to the backend writer services module 318. The backend writer module 318 then checks the backend request database 300 to determine if there is a match with the message request. If there is no match, the backend writer writes the message request into the backend request database 300 and dispatches the message request to the message processor 230. If there is a match, the backend writer 318 sets a transport attribute of the message request and dispatches the message request through the connector services 316 to the backend reader module 322.

The backend reader module 322 recognizes that the transport attribute is set and calculates a message digest from the message request. A check is then performed by the backend reader module 322 in the backend response database 324 for matching message digests. If no match is found or an existing response indicating that the message request is "in progress" is found, a message is sent back to the backend writer module 318. Upon receipt of this message the backend writer module 318 starts the timer processes and logs any message requests that time-out. If a finalized match (e.g. an actioned response and not an "in progress" response) is found the existing response is copied from the backend response database 324 to form a new response. The new response is then dispatched to the message source in the same way as is described above for responses generated by the message processor 230.

As indicated above, the payments services module 314 starts a unique monitor processing thread identifiable by the message digest of the message request. The monitor processing thread is a stand alone process that is executed under the control of a computer operating system capable of handling multiple threads, such as, for example, a UNIX™ operating system. A unique monitor thread process identification number (PID), assigned by the operating system when the thread is initialized, is correlated with the message digest to enable the payments services module 314 to identify the monitor processing thread corresponding to any particular message request.

Once the monitor processing thread has been initialized it starts to monitor the time elapsed since its creation and compares this time to a predetermined time period set by the payments services module 314. This predetermined time period may be determined in advance by a system administrator and/or vary in accordance with the request message content and/or message processor type. This monitoring process continues until it either times out or the monitor processing thread is terminated by the operating system. If the monitor processing thread encounters a timeout event, it notifies the operating system by way of an interrupt event and then terminates itself. The operating system then notifies the payments services module 314 that a monitor processing thread has timed out and provides the payments services module 314 with the PID of that thread. From the PID the payments services module 314 can identify the message request for which the monitor processing thread has timed out.

Once notified of a timed out message request, the payments services module 314 interrogates the backend reader module 322 and backend writer module 318 to determine whether there are entries in the backend request database 300 and/or the backend response database 324 corresponding to the message request. If the backend writer module 318 indicates that it has not received the message request but the backend reader module 322 indicates that it has received the message request, this could indicate that there is a problem with the backend request database 300. If the backend writer module 318 indicates that it has not received the message request and the backend reader module 322 also indicates that it has not received the message request, this could indicate that there is a problem with the backend databases 300, 324 and/or connector services 316. In both cases, where the backend writer module 318 indicates that it has not received the message request, the payments services module 314 can generate a user/administrator notification message indicating that there is a problem that needs to be addressed and one or more possible cause.

If the backend writer module 318 has received the message request, the payments services module 314 determines whether an actioned response has been issued to the backend reader module 322 in final settlement of the message request. The payments services module 314 checks to determine whether the message response is an actioned response by comparing the response held in the backend response database 324 to a list of all possible message responses that are known to be actioned responses. Where an actioned response is found it is dispatched by the payments services module 314 to the router 306 for forwarding on. If this happens, payments services may formulate a system administrator message indicating that there might be a problem with connector services 316.

Should there be no response or no actioned response at the backend reader module 322, the payments services module 314 formulates a query message using a structured query language (SQL) protocol. The query message contains a message digest for the message request. The query message is dispatched to the connector services module 316 for forwarding on to the message processor 230 over a query path 317.

The query message instructs the message processor 230 to provide any information it has regarding the message request.

The message processor 230 formulates an SQL query response containing a response to the query message and dispatches it to the payments services module 314 over the query path 317 through connector services 316. The query response may indicate that the message request was never received by the message processor 230. In this case, the payments services module 314 formulates a further query message that contains the message request and dispatches it to the message processor 230. Upon receipt of the further message request, the message processor 230 extracts the message request and places it into a queue to await processing. The message processor 230 dispatches a further query response to the payments services module 314 instructing it to initialize a new monitor processing thread corresponding to the message request. In this way, a timeout timer is effectively reset and processing of the message request is continuously monitored.

If the message request has been received previously by the message processor 230, the message processor 230 may formulate a number of query responses for dispatch to the payments services module 314 over the query path 317 via connector services 316. Where the message request is already in a queue for processing, the message processor 230 formulates an SQL query response that instructs the payments services module 314 to wait. Upon receipt of such a query response, the payments services module 314 initializes a new monitor processing thread corresponding to the message request.

Other query responses may be issued by the message processor 230 to control the operation of the payments services module 314. For example, the query response may indicate that the message request has been received and/or provide results of any processing performed by the message processor 230. The payments services module 314 may act in dependence on the content of the query responses, such as, for example, by generating a message containing the content and dispatching it via the router 306 to a statistical analysis module (not shown) that gathers statistics for system analysis/administration purposes.

Figure 12:
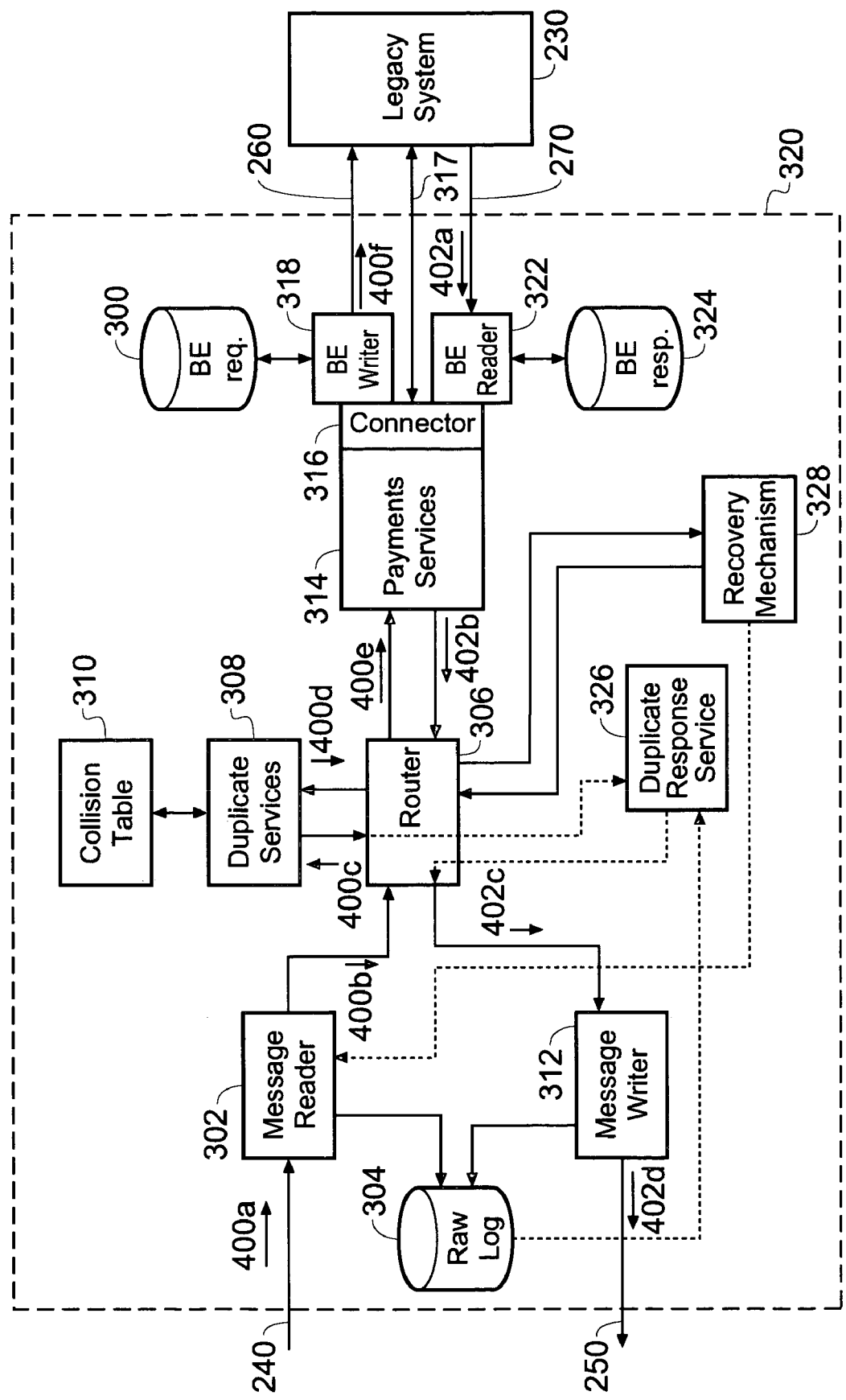
FIG. 12 shows the flow of a message request and response in a message brokering system according to the embodiment of FIG. 11.

FIG. 12 shows the flow of a message request 400 and response 402 in the message brokering system 320 of FIG. 11, when the request is processed by the message processor 230. The message request position (400a-400f) is represented sequentially in the message brokering system 320 by the suffix letters a-f. The response position (402a-402d) is represented sequentially in the message brokering system 320 by the suffix letters a-d.

Message reader service module 302 is shown receiving a message request 400a along the message request path 240. On receiving the message request 400a, the message reader service module 302 performs the step of sending a copy of the message request 400a to the raw log database 304 to be recorded. The message reader service module 302 handles the message request 400b by forwarding it to the router 306. In this example, the router 306 implements a checking process in which it is determined that the message request 400b is not a recovery request and the message request is a normal message request. The router 306 performs a forwarding operation by sending the message request 400c to the duplicate services module 308.

The duplicate services module 308 can control one or more processes operating on a distributed processing system. Where load balancing is used, the duplicate services module 308 implements a checking process to determine which of the processes can best deal with the message request 400c. The duplicate services module 308 performs the step of forwarding the message request 400c to the selected process. The process generates a message digest from the message request 400c and performs the step of checking the message digest against message digest entries of previously received message requests 400 held in the collision table 310. In this example no match is found and so the process sends the message request 400d back to the duplicate services module 308 along with an attribute indicating that the message request 400c is not a duplicate message request. The process performs the step of writing the message digest into the collision table 310.

Upon receiving the message request 400d and the indicator attribute, the router 306 checks the indicator attribute. On determining that the message request 400d is not a duplicate, the router 306 performs the step of dispatching the message request 400e to the payments services module 314.

The payments services module 314 forms part of a service system for managing payment transactions over a private network. Upon receiving the message request 400e the payments services module 314 may perform the step of reformatting the message request 400e according to the protocol of the private network. Payments services performs the step of dispatching the message request 400e through the connector services 316 to the backend writer services module 318. Payment services may also provide steps to invoke certificate validation and certification services when used in a trust-based payments system.

On receiving the message request 400e, the backend writer service module 318 performs the steps of creating a message digest from the message request and checking the SQL backend request database 300 for any matching message digests indicating duplicate message requests. In this example, the matching process provides no match indicating a duplicate message request, so the backend writer 318 performs the steps of writing the message digest into the backend request database 300 and dispatching the message request 400f along the message request path 260 to the message processing system 230.

Once the message processing system 230 has performed the steps necessary to process the message request, it performs the step of sending a response 402a, including a message request identifier such as a digest of the message request, along the message response path 270 to a backend reader service module 322. The backend reader service module 322 performs the steps of storing a copy of the response 402a in an SQL implemented backend response database 324 and dispatching the response 402a through the connector services 316 to the payment services module 314.

The payment services module 314 may perform a reformatting operation on the response 402a and/or an operation adding a validation certificate(s) before dispatching the response 402b to the router 306. Router 306 performs a dispatch operation sending the response 402c to the message writer service 312. The message writer service 312 performs an operation recording a copy of the response 402c in the raw log database 304 and another operation dispatching the response 402d back to the message source along the message response path 250. The message writer service performs an operation recording all responses 402 it receives in the raw log database 304, so that the raw log database 304 maintains an accurate sequential record of all the responses 402 that are sent.

Figure 13:
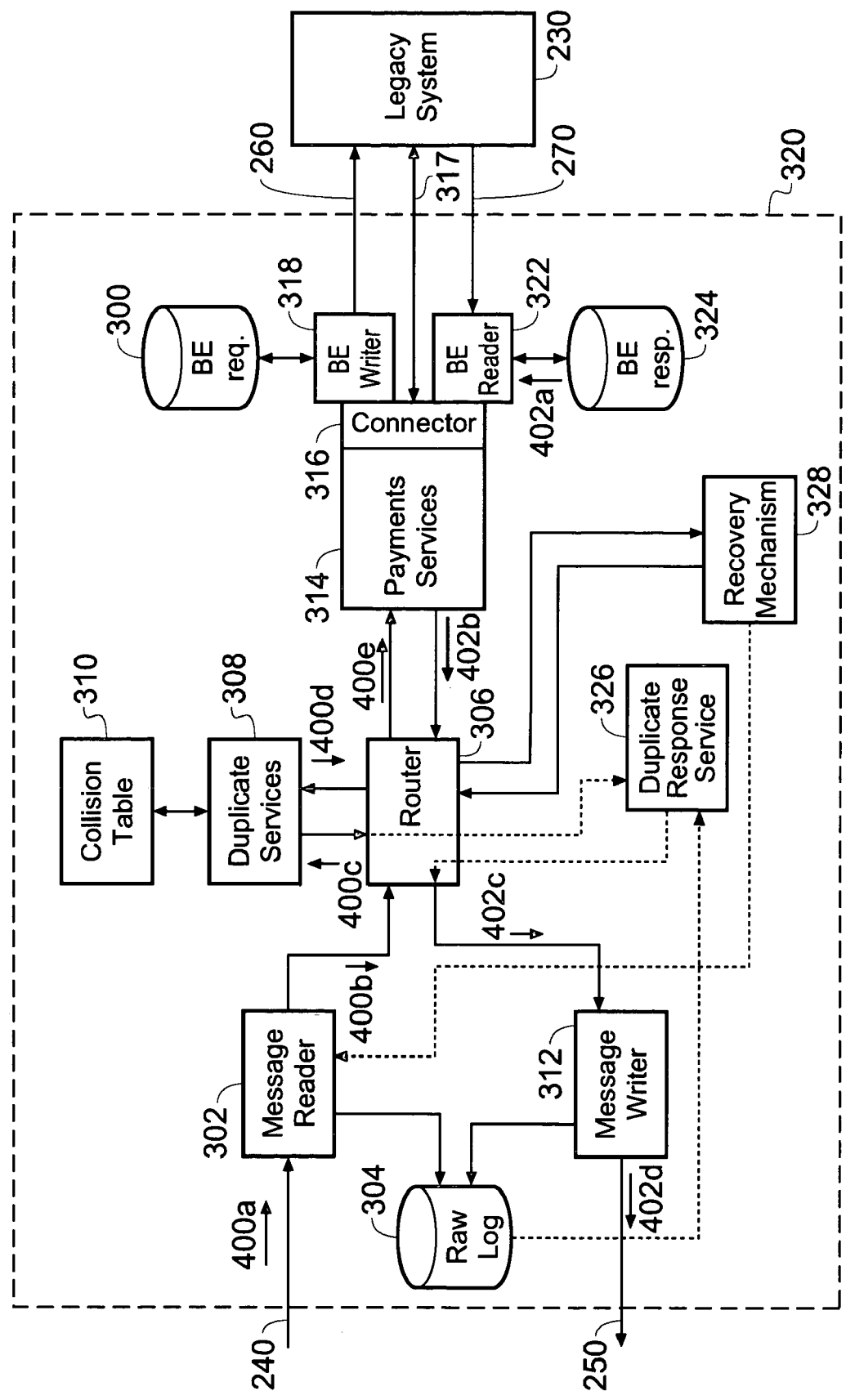
FIG. 13 shows the flow of a message request and response in a message brokering system according to the embodiment of FIG. 11.

FIG. 13 shows the flow of a message request 400 and response 402 in the message brokering system 320 of FIG. 11, when the request is screened by the second stage of the message brokering system 320. The message flow and processing steps are essentially the same as those in FIG. 12 up to the point where the backend writer module 318 receives the message request 400e from payments services 314. On checking the message digest of the message request 400e the backend writer module 318 determines there is a matching previously received message request.

The backend writer 318 performs the steps of setting a transport attribute of the message request 400e and dispatching the message request 400e through the connector services 316 to the backend reader module 322. The backend reader module 322 recognizes that the transport attribute is set and performs the step of calculating a message digest from the message request 400e. Of course, the backend reader module 322 may receive the message digest calculated by the backend writer module 318 instead of the whole message request 400e as part of a transport request. The backend reader module 322 performs a checking operation in the backend response database 324 for matching message digests. If a match is found the existing response 402a is copied from the backend response database 324 to form the new response. If no match is found a timer process is started by the backend reader module 322. Where no response is received to the corresponding request by the backend reader module 322 with a set time period, the message request times-out. The backend reader module 322 then notifies the backend writer module 318 of the time-out through the connector services 316. The backend writer module 318 then records the time-out message request in a log. The log can be used during manual processing. A new message indicating that the request has timed out is generated in place of the response 402a, and the response 402a is then dispatched to the message source in the same way as is described above in connection with FIG. 12.

Figure 14:
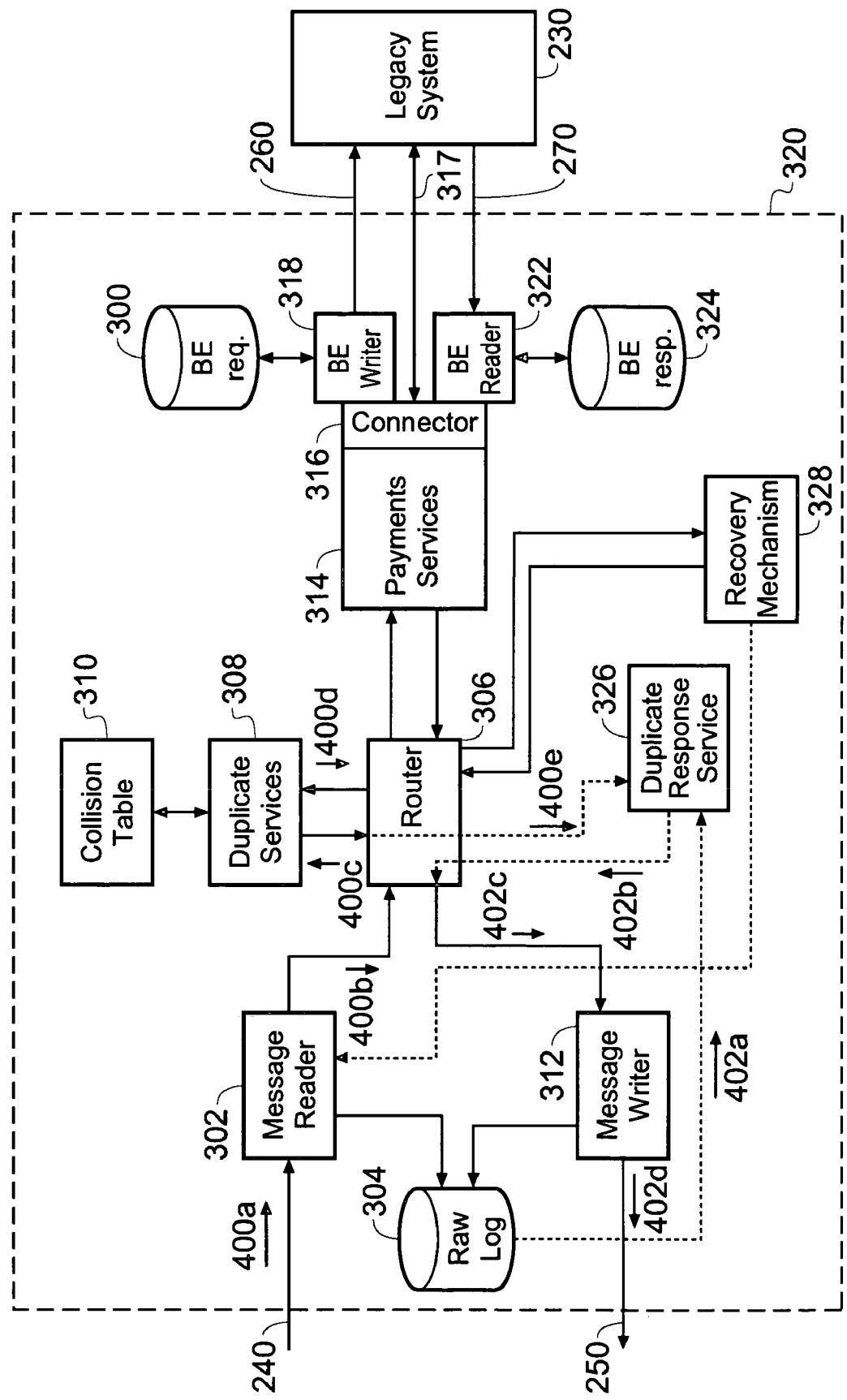
FIG. 14 shows the flow of a message request and response in a message brokering system according to the embodiment of FIG. 11.

FIG. 14 shows the flow of a message request 400 and response 402 in the message brokering system 320 of FIG. 11, when the request is screened by the first stage of the message brokering system 320. The message request position (400a-400e) is represented sequentially in the message brokering system 320 by the suffix letters a-e. The response position (402a-402d) is represented sequentially in the message brokering system 320 by the suffix letters a-d. The processes involved are the same as those discussed above in connection with FIG. 12 up until the point at which the message request 400c is received by a process providing checking for the duplicate services module 308.

On determining that there is a match between the message request 400c and a record in the collision table 310, the process implements the step of returning the message request 400c to the duplicate services module 308 with a duplicate attribute of the message request 400c set indicating that the message request is a duplicate. Duplicate services performs the step of dispatching the message request 400d to the router 306. The router 306 identifies that the duplicate attribute is set as part of its receiving process, and then performs the step of dispatching the message request 400e to the duplicate response service module 326.

The duplicate response service module 326 implements a process of checking the raw log database 304 for any existing response to the message request 400e. If the checking process determines that there is at least one existing response 402a, the duplicate response service module 326 performs the step of sending the most recent response 402b as if it were a new response to the router 306 for subsequently dispatching to the message writer service 312. If there is no existing response, the duplicate response service module 326 sends a new response 402b in place of any existing response 402a indicating that the message request is "in progress" to the router 306 for subsequently dispatching to the message writer service 312. The message writer service 312 performs the recording and forwarding steps as previously described, thereby dispatching the new response 402d along the message response path 250.

Figure 15:
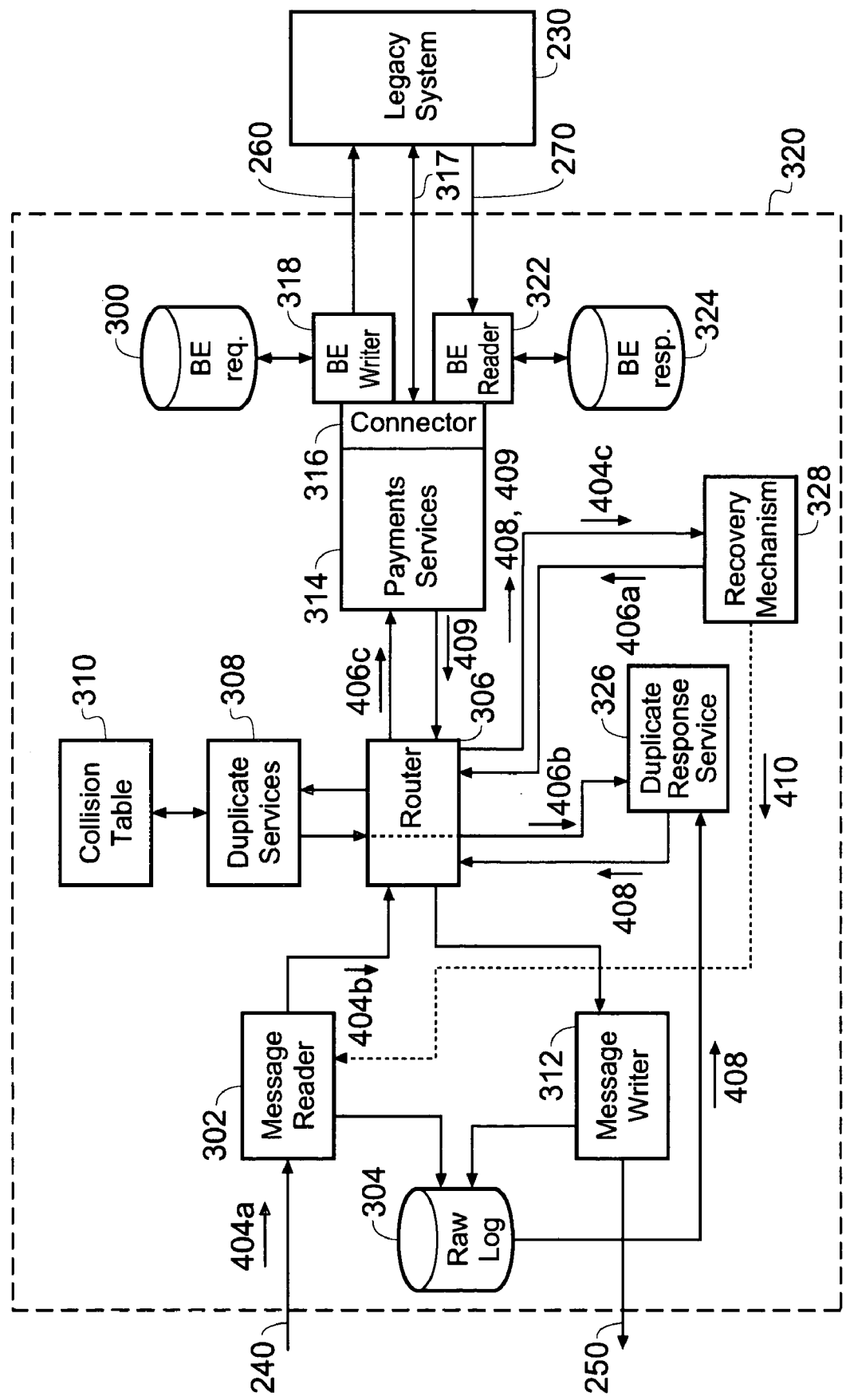
FIG. 15 shows the flow of a message request and response in a message brokering system according to the embodiment of FIG. 11.

FIG. 15 shows the flow of a message request 400 and response 402 in the message brokering system 320 of FIG. 11, when a recovery initiation is requested. The router 306 receives the message request 404b using the process described above in connection with FIG. 12. As part of a receiving process, the router 306 operates a checking procedure in which recovery attributes of message requests 400 are checked. The recovery attributes of message requests 400 can include a recovery and recovery initiation attribute, such as the one or more bits used as flags. When the router 306 determines that the recovery initiation bit in the request message 404b is set, it performs the step of dispatching the message request 404c to the recovery mechanism 328.

The recovery mechanism 328 initiates the recovery process. As part of the recovery process the recovery mechanism performs the steps of sending an information gathering message 406a to the first and second stages through the router 306. The recovery mechanism 328 performs the steps of dispatching a first information gathering message 406b to the duplicate response service 326 and a second information gathering message 406c to the payments services 316. The duplicate response service 326 implements the step of gathering a first set of unfinished message requests 408 from the raw log database 304. The recovery mechanism 328 dispatches the information gathering message 406c to the payments services 314. The payments services then implements a process of recovering a second set of unfinished message requests 409 by comparing entries in the backend request database 300 and the backend response database 324. The second set of unfinished message requests 409 are dispatched through the router 306 to the recovery mechanism 328. The recovery mechanism 328 performs the steps of setting a recovery attribute for each message request in the unfinished message request sets 408, 409 (thereby converting each into a special message request 410) and dispatching them to the message reader 302. The subsequent events are shown in FIG. 16.

Figure 16:
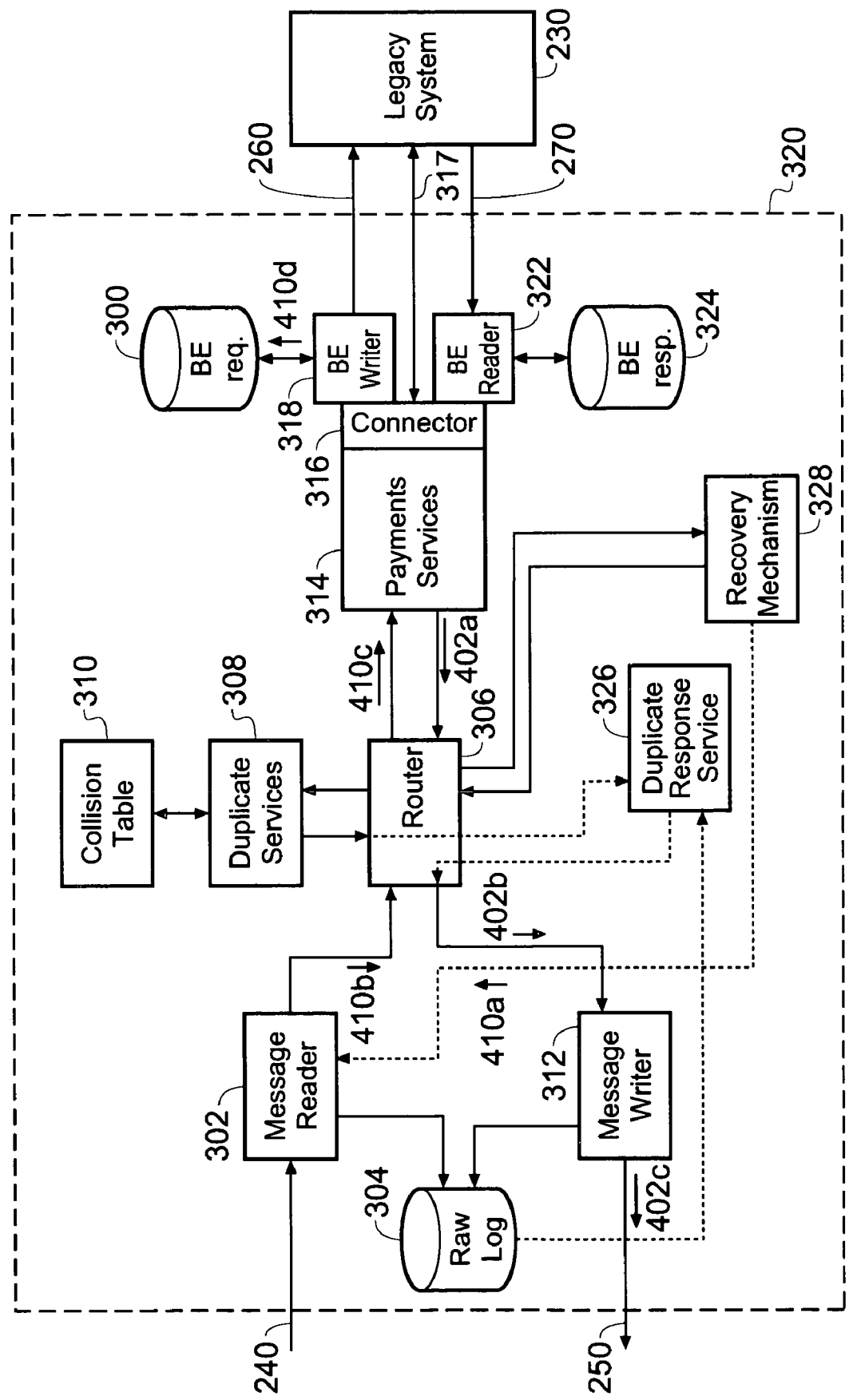
FIG. 16 shows the flow of a message request and response during a system recovery in a message brokering system according to the embodiment of FIG. 11.

FIG. 16 shows the flow of a special message request 410 in the message brokering system 320 of FIG. 11, where a recovery attribute in the request message 410 is set. The message request(s) is dispatched directly to the second stage for processing as a special request. A special message request 410a is received by message reader 302 which performs the step of dispatching the special message request 410b to the router 306. The router 306 performs the step of dispatching the special message request 410b to the backend writer module 318 through the payments services 314. The backend writer 318 performs the step of checking with the backend reader 322 if there is an existing response in the backend response database 324, as described above. Where there is no final response, the backend writer module 318 starts a timer service. If during the timer service interval the backend writer 318 receives an acknowledgement from the backend reader 322 that a response to the message request has been generated, the timer service is terminated and the response is dispatched as described previously. If no response is received, the service times out and alerts the backend writer module 318. The backend writer module 318 sends the message request 410d to the backend response database 300 for storing in a special log of failed message requests. This log can be used when manually restarting failed transactions. The backend writer module 318 then generates a response 402a indicating that the message request has timed out. The response 402a is then dispatched as described previously.

Insofar as embodiments of the invention described above are implementable, at least in part, using a software-controlled programmable processing device such as a Digital Signal Processor, microprocessor, other processing devices, data processing apparatus or computer system, it will be appreciated that a computer program for configuring a programmable device, apparatus or system to implement the foregoing described methods is envisaged as an aspect of the present invention. The computer program may be embodied as source code and undergo compilation for implementation on a processing device, apparatus or system, or may be embodied as object code, for example. The skilled person would readily understand that the term computer in its most general sense encompasses programmable devices such as referred to above, and data processing apparatus and computer systems.

Suitably, the computer program is stored on a carrier medium in machine or device readable form, for example in solid-state memory, magnetic memory such as disc or tape, optically or magneto-optically readable memory, such as compact disk read-only or read-write memory (CD-ROM, CD-RW), digital versatile disk (DVD) etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

Although the invention has been described in relation to the preceding example embodiments, it will be understood by those skilled in the art that the invention is not limited thereto, and that many variations are possible falling within the scope of the invention. For example, methods for performing operations in accordance with any one or combination of the embodiments and aspects described herein are intended to fall within the scope of the invention. As another example, message request and response paths may be implemented using any available mechanisms, including mechanisms using of one or more of: wired, WWW, LAN, Internet, WAN, wireless, optical, satellite, TV, cable, microwave, telephone, cellular etc. The message response and request paths may also be secure links. For example, the message response and request paths can be secure links created over the Internet using Public Key Encryption techniques or as an SSL link. It is also possible to use the message processing mechanism to formulate first and/or second stage responses to particular classes or types of message request. For example, message requests may be used to request information and/or invoke system administration functions.

It is to be understood that the first stage may be operable to check if message requests are new and dispatch any new message requests to the second stage, and check previously received message request messages to find any existing responses for dispatch to the message source. Moreover, the order of checking performed by the stages and whether or not checks are based upon negative or positive conditions are deemed to be only minor variations that are intended to fall within the scope of the invention.

The scope of the present disclosure includes any novel feature or combination of features disclosed therein either explicitly or implicitly or any generalization thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt the term "comprising", as used herein throughout the description and claims is not to be construed solely as meaning "consisting only of".

The invention claimed is:

1. An apparatus comprising:
one or more processors; and
a storage device storing program instructions executable by the one or more processors to implement a message brokering mechanism including:
a first stage operable to interface with a message source, wherein the first stage is configured to maintain a first set of records identifying message requests received from the message source and message responses sent to the message source;
a second stage operable to interface with a message processor, wherein the second stage is configured to maintain a second set of records identifying message requests sent to the message processor and message responses received from the message processor; and
a recovery mechanism;
wherein the first stage is configured to determine whether a normal message request received from the message source is a duplicate request and, if the normal message request is not a duplicate request, to dispatch the normal message request to the second stage, and, if the normal message request is a duplicate request, to send a message response to the message source without dispatching the normal message request to the second stage;
wherein, in response to receiving the normal message request, the second stage is configured to send the normal message request to the message processor and, if a message response is received from the message processor, to dispatch the message response to the first stage for sending to the message source;
wherein, in response to receiving a recovery process activation message, the recovery mechanism is configured to access each of the first and second sets of records to identify those message requests for which a corresponding message response is not included indicating that the message request has been processed and to convert each such message request into a corresponding special message request; and
wherein, in response to receiving a given special message request, the second stage is configured to send a corresponding request to the message processor and to start a timer process and, if a response is not received from the message processor within a designated time period as dictated by the timer process, to identify the corresponding request as a failed request.

2. The apparatus as recited in claim 1 wherein, in response to determining that the normal message request is a duplicate request, the first stage is further configured to determine whether an existing message response is included in the first set of records.

3. The apparatus as recited in claim 2 wherein, in response to determining that an existing message response is included in the first set of records, the first stage is further configured to send the existing message response to the message source.

4. The apparatus as recited in claim 2 wherein, in response to determining that an existing message response is not included in the first set of records, the first stage is further configured to send an in progress message response to the message source.

5. The apparatus as recited in claim 1 wherein, in response to receiving the given special message request, the second stage is configured to determine whether an existing response message to the given special message request is included in the second set of records and, if so, to send the existing response to the first stage for forwarding to the message source instead of sending the corresponding request to the message processor and starting the timer process.

6. The apparatus as recited in claim 1 wherein the recovery mechanism is configured to convert a message request from a normal message request into a special message request by setting a recovery attribute bit.

7. The apparatus as recited in claim 1 wherein the recovery mechanism is configured to convey each special message request to the first stage, and wherein the first stage is configured to identify said each special message request in the first set of records.

8. The apparatus as recited in claim 7 wherein the first stage is configured to determine whether a message request is a normal message request or a special message request, and wherein the first stage is configured to send each special message request to the second stage without determining whether the special message request is a duplicate request.

9. The apparatus as recited in claim 1 wherein the second stage is configured to identify the corresponding request as a failed request in a failure log.

10. The apparatus as recited in claim 1 wherein the first set of records are stored in a first database.

11. The apparatus as recited in claim 1 wherein the second set of records are stored in a second database.

12. A transaction processing system comprising:
a message processor;
one or more processors; and
a storage device storing program instructions executable by the one or more processors to implement a message brokering mechanism including:
a first stage operable to interface with a message source, wherein the first stage is configured to maintain a first set of records identifying message requests received from the message source and message responses sent to the message source;
a second stage operable to interface with the message processor, wherein the second stage is configured to maintain a second set of records identifying message requests sent to the message processor and message responses received from the message processor; and
a recovery mechanism;
wherein the first stage is configured to determine whether a normal message request received from the message source is a duplicate request and, if the normal message request is not a duplicate request, to dispatch the normal message request to the second stage, and, if the normal message request is a duplicate request, to send a message response to the message source without dispatching the normal message request to the second stage;
wherein, in response to receiving the normal message request, the second stage is configured to send the normal message request to the message processor and, if a message response is received from the message processor, to dispatch the message response to the first stage for sending to the message source;
wherein, in response to receiving a recovery process activation message, the recovery mechanism is configured to access each of the first and second sets of records to identify those message requests for which a corresponding message response is not included indicating that the message request has been processed and to convert each such message request into a corresponding special message request; and wherein, in response to receiving a given special message request, the second stage is configured to send a corresponding request to the message processor and to start a timer process and, if a response is not received from the message processor within a designated time period as dictated by the timer process, to identify the corresponding request as a failed request.

13. The system as recited in claim 12 wherein, in response to determining that the normal message request is a duplicate request, the first stage is further configured to determine whether an existing message response is included in the first set of records.

14. The system as recited in claim 13 wherein, in response to determining that an existing message response is included in the first set of records, the first stage is further configured to send the existing message response to the message source.

15. The system as recited in claim 13 wherein, in response to determining that an existing message response is not included in the first set of records, the first stage is further configured to send an in progress message response to the message source.

16. The system as recited in claim 12 wherein, in response to receiving the given special message request, the second stage is configured to determine whether an existing response message to the given special message request is included in the second set of records and, if so, to send the existing response to the first stage for forwarding to the message source instead of sending the corresponding request to the message processor and starting the timer process.

17. The system as recited in claim 12 wherein the recovery mechanism is configured to convert a message request from a normal message request into a special message request by setting a recovery attribute bit.

18. The system as recited in claim 12 wherein the recovery mechanism is configured to convey each special message request to the first stage, and wherein the first stage is configured to identify said each special message request in the first set of records.

19. The system as recited in claim 18 wherein the first stage is configured to determine whether a message request is a normal message request or a special message request, and wherein the first stage is configured to send each special message request to the second stage without determining whether the special message request is a duplicate request.

20. The system as recited in claim 12 wherein the second stage is configured to identify the corresponding request as a failed request in a failure log.

21. The system as recited in claim 12 wherein the first set of records are stored in a first database.

22. The system as recited in claim 12 wherein the second set of records are stored in a second database.

23. A storage medium storing program instructions executable by a computing device to implement a message brokering mechanism including:
   a first stage operable to interface with a message source, wherein the first stage is configured to maintain a first set of records identifying message requests received from the message source and message responses sent to the message source;
   a second stage operable to interface with a message processor, wherein the second stage is configured to maintain a second set of records identifying message requests sent to the message processor and message responses received from the message processor; and
   a recovery mechanism;
   wherein the first stage is configured to determine whether a normal message request received from the message source is a duplicate request and, if the normal message request is not a duplicate request, to dispatch the normal message request to the second stage, and, if the normal message request is a duplicate request, to send a message response to the message source without dispatching the normal message request to the second stage;
   wherein, in response to receiving the normal message request, the second stage is configured to send the normal message request to the message processor and, if a message response is received from the message processor, to dispatch the message response to the first stage for sending to the message source;
   wherein, in response to receiving a recovery process activation message, the recovery mechanism is configured to access each of the first and second sets of records to identify those message requests for which a corresponding message response is not included indicating that the message request has been processed and to convert each such message request into a corresponding special message request; and
   wherein, in response to receiving a given special message request, the second stage is configured to send a corresponding request to the message processor and to start a timer process and, if a response is not received from the message processor within a designated time period as dictated by the timer process, to identify the corresponding request as a failed request.

24. The storage medium as recited in claim 23 wherein, in response to determining that the normal message request is a duplicate request, the first stage is further configured to determine whether an existing message response is included in the first set of records.

25. The storage medium as recited in claim 24 wherein, in response to determining that an existing message response is included in the first set of records, the first stage is further configured to send the existing message response to the message source.

26. The storage medium as recited in claim 24 wherein, in response to determining that an existing message response is not included in the first set of records, the first stage is further configured to send an in progress message response to the message source.

27. The storage medium as recited in claim 23 wherein, in response to receiving the given special message request, the second stage is configured to determine whether an existing response message to the given special message request is included in the second set of records and, if so, to send the existing response to the first stage for forwarding to the message source instead of sending the corresponding request to the message processor and starting the timer process.

28. The storage medium as recited in claim 23 wherein the recovery mechanism is configured to convert a message request from a normal message request into a special message request by setting a recovery attribute bit.

29. The storage medium as recited in claim 23 wherein the recovery mechanism is configured to convey each special message request to the first stage, and wherein the first stage is configured to identify said each special message request in the first set of records.

30. The storage medium as recited in claim 23 wherein the first stage is configured to determine whether a message request is a normal message request or a special message request, and wherein the first stage is configured to send each special message request to the second stage without determining whether the special message request is a duplicate request.

31. The storage medium as recited in claim 23 wherein the second stage is configured to identify the corresponding request as a failed request in a failure log.

32. The storage medium as recited in claim 23 wherein the first set of records are stored in a first database.

33. The storage medium as recited in claim 23 wherein the second set of records are stored in a second database.

* * * * *

UNITED STATES PATENT AND TRADEMARK OFFICE
CERTIFICATE OF CORRECTION

PATENT NO. : 7,653,679 B2 Page 1 of 1
APPLICATION NO. : 10/219461
DATED : January 26, 2010
INVENTOR(S) : Kantor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1936 days.

Signed and Sealed this

Twenty-third Day of November, 2010

David J. Kappos
*Director of the United States Patent and Trademark Office*